US008209753B2

(12) United States Patent     (10) Patent No.:    US 8,209,753 B2
Wen et al.     (45) Date of Patent:    Jun. 26, 2012

(54) UNIVERSAL SECURE MESSAGING FOR REMOTE SECURITY TOKENS

(75) Inventors: Wu Wen, Sunnyvale, CA (US); Eric F. Le Saint, Los Altos, CA (US); Jerome Antoine Marie Becquart, Fremont, CA (US)

(73) Assignee: Activcard, Inc., Fremont, CA (US)

( * ) Notice: Subject to any disclaimer, the term of this patent is extended or adjusted under 35 U.S.C. 154(b) by 1733 days.

(21) Appl. No.: 10/740,920

(22) Filed: Dec. 22, 2003

(65) Prior Publication Data

US 2004/0143730 A1    Jul. 22, 2004

Related U.S. Application Data

(63) Continuation-in-part of application No. 10/424,783, filed on Apr. 29, 2003, now abandoned, which is a continuation-in-part of application No. 09/880,795, filed on Jun. 15, 2001, now abandoned.

(51) Int. Cl.
    *G06F 21/00*     (2006.01)
(52) U.S. Cl. ............ 726/20; 705/67; 380/259; 713/159; 713/169; 713/172
(58) Field of Classification Search .................. 713/159, 713/169, 172; 380/259; 726/20; 705/65, 705/67
See application file for complete search history.

(56) References Cited

U.S. PATENT DOCUMENTS

| | | | |
|---|---|---|---|
| 4,945,468 A | | 7/1990 | Carson et al. |
| 4,993,068 A | | 2/1991 | Piosenka et al. |
| 5,131,038 A | * | 7/1992 | Puhl et al. .................... 340/5.61 |
| 5,276,735 A | * | 1/1994 | Boebert et al. ............... 713/167 |
| 5,309,501 A | * | 5/1994 | Kozik et al. .................. 455/410 |
| 5,347,580 A | * | 9/1994 | Molva et al. .................. 713/159 |
| 5,448,045 A | * | 9/1995 | Clark ............................. 235/382 |
| 5,491,752 A | | 2/1996 | Kaufman et al. |
| 5,499,297 A | * | 3/1996 | Boebert ......................... 713/159 |
| 5,546,463 A | * | 8/1996 | Caputo et al. ................ 713/159 |
| 5,577,121 A | | 11/1996 | Davis et al. |
| 5,638,444 A | * | 6/1997 | Chou et al. .................... 380/284 |
| 5,655,148 A | | 8/1997 | Richman et al. |
| 5,742,756 A | * | 4/1998 | Dillaway et al. ............... 726/20 |

(Continued)

FOREIGN PATENT DOCUMENTS

DE     19724901     12/1998

(Continued)

OTHER PUBLICATIONS

"Microsoft Windows 2000 Server, Smart Cards;" Microsoft Corporation, 1999, 16 pages total.

(Continued)

*Primary Examiner* — David García Cervetti
(74) *Attorney, Agent, or Firm* — Muirhead and Saturnelli, LLC

(57) ABSTRACT

An anonymous secure messaging method, system and computer program product for implementation over a wireless connection. The invention allows the securely exchange of information between a security token enabled computer system and an intelligent remote device having an operatively coupled security token thereto over the wireless connection. The invention establishes an anonymous secure messaging channel between the security token and the security token enabled computer system, which allows the intelligent remote device to emulate a locally connected security token peripheral device without requiring a physical connection. A dedicated wireless communications channel is incorporated to prevent several concurrent wireless connections from being established with the security token and potentially compromising the security of the information being sent on concurrent wireless connections.

52 Claims, 12 Drawing Sheets

U.S. PATENT DOCUMENTS

| | | | |
|---|---|---|---|
| 5,778,071 A * | 7/1998 | Caputo et al. | 713/159 |
| 5,802,176 A | 9/1998 | Audebert | |
| 5,821,854 A * | 10/1998 | Dorinski et al. | 340/539.21 |
| 5,841,868 A | 11/1998 | Helbig, Sr. | |
| 5,842,118 A * | 11/1998 | Wood, Jr. | 455/101 |
| 5,878,142 A * | 3/1999 | Caputo et al. | 713/159 |
| 5,887,065 A | 3/1999 | Audebert | |
| 5,937,068 A * | 8/1999 | Audebert | 713/185 |
| 5,953,424 A * | 9/1999 | Vogelesang et al. | 713/169 |
| 6,002,427 A * | 12/1999 | Kipust | 348/156 |
| 6,005,942 A | 12/1999 | Chan et al. | |
| 6,016,476 A * | 1/2000 | Maes et al. | 705/18 |
| 6,038,551 A * | 3/2000 | Barlow et al. | 705/41 |
| 6,070,240 A * | 5/2000 | Xydis | 726/17 |
| 6,075,860 A * | 6/2000 | Ketcham | 713/159 |
| 6,076,075 A | 6/2000 | Teicher | |
| 6,084,968 A * | 7/2000 | Kennedy et al. | 380/259 |
| 6,108,789 A * | 8/2000 | Dancs et al. | 726/9 |
| 6,169,804 B1 | 1/2001 | Ryan, Jr. et al. | |
| 6,173,400 B1 * | 1/2001 | Perlman et al. | 713/172 |
| 6,175,922 B1 | 1/2001 | Wang | |
| 6,178,504 B1 * | 1/2001 | Fieres et al. | 713/164 |
| 6,189,099 B1 * | 2/2001 | Rallis et al. | 713/172 |
| 6,198,823 B1 * | 3/2001 | Mills | 380/247 |
| 6,216,230 B1 * | 4/2001 | Rallis et al. | 713/185 |
| 6,233,683 B1 | 5/2001 | Chan et al. | |
| 6,308,317 B1 | 10/2001 | Wilkinson et al. | |
| 6,373,946 B1 * | 4/2002 | Johnston | 380/211 |
| 6,378,073 B1 * | 4/2002 | Davis et al. | 726/1 |
| 6,385,729 B1 * | 5/2002 | DiGiorgio et al. | 726/9 |
| 6,397,328 B1 | 5/2002 | Pitchenik et al. | |
| 6,425,084 B1 * | 7/2002 | Rallis et al. | 713/185 |
| 6,459,704 B1 * | 10/2002 | Jandrell | 370/445 |
| 6,481,632 B2 * | 11/2002 | Wentker et al. | 235/492 |
| 6,490,679 B1 * | 12/2002 | Tumblin et al. | 713/155 |
| 6,547,150 B1 | 4/2003 | Deo et al. | |
| 6,570,610 B1 * | 5/2003 | Kipust | 348/156 |
| 6,588,660 B1 * | 7/2003 | Buescher et al. | 235/382 |
| 6,601,771 B2 * | 8/2003 | Charrin | 235/492 |
| 6,609,199 B1 * | 8/2003 | DeTreville | 713/172 |
| 6,657,956 B1 | 12/2003 | Sigaud | |
| 6,694,436 B1 | 2/2004 | Audebert | |
| 6,738,901 B1 | 5/2004 | Boyles et al. | |
| 6,748,532 B1 | 6/2004 | Digiorgio et al. | |
| 6,763,315 B2 * | 7/2004 | Xydis | 702/127 |
| 6,788,956 B2 | 9/2004 | Bos et al. | |
| 6,877,094 B1 * | 4/2005 | DiGiorgio et al. | 713/176 |
| 6,931,529 B2 * | 8/2005 | Kunzinger | 713/153 |
| 6,993,658 B1 * | 1/2006 | Engberg et al. | 713/185 |
| 7,020,773 B1 * | 3/2006 | Otway et al. | 713/171 |
| 7,024,689 B2 | 4/2006 | O'Donnell et al. | |
| 7,080,782 B2 * | 7/2006 | Charrin | 235/451 |
| 7,114,178 B2 * | 9/2006 | Dent et al. | 726/6 |
| 7,152,230 B2 | 12/2006 | Sato et al. | |
| 7,162,631 B2 * | 1/2007 | Audebert et al. | 713/160 |
| 7,225,465 B2 * | 5/2007 | Audebert et al. | 726/20 |
| 7,269,732 B2 * | 9/2007 | Kilian-Kehr | 713/172 |
| 7,269,844 B2 * | 9/2007 | Elteto et al. | 726/2 |
| 7,302,571 B2 * | 11/2007 | Noble et al. | 713/173 |
| 7,310,734 B2 * | 12/2007 | Boate et al. | 713/186 |
| 7,324,645 B1 * | 1/2008 | Juopperi et al. | 380/247 |
| 7,340,600 B1 * | 3/2008 | Corella | 713/155 |
| 7,363,486 B2 * | 4/2008 | Audebert et al. | 713/150 |
| 7,366,703 B2 * | 4/2008 | Gray et al. | 705/78 |
| 7,409,552 B2 * | 8/2008 | Buttyan et al. | 713/172 |
| 7,650,647 B1 * | 1/2010 | Hansmann et al. | 726/34 |
| 7,907,935 B2 * | 3/2011 | Le Saint et al. | 455/411 |
| 8,065,718 B2 * | 11/2011 | Grove et al. | 726/9 |
| 2001/0007815 A1 * | 7/2001 | Philipsson | 455/41 |
| 2001/0012360 A1 * | 8/2001 | Akkar et al. | 380/29 |
| 2001/0013830 A1 * | 8/2001 | Garber et al. | 340/572.4 |
| 2001/0020897 A1 * | 9/2001 | Takatori et al. | 340/572.7 |
| 2001/0021950 A1 * | 9/2001 | Hawley et al. | 709/225 |
| 2001/0024066 A1 | 9/2001 | Fu et al. | |
| 2001/0037312 A1 * | 11/2001 | Gray et al. | 705/67 |
| 2001/0045451 A1 * | 11/2001 | Tan et al. | 235/375 |
| 2002/0002684 A1 | 1/2002 | Fox et al. | |
| 2002/0040936 A1 * | 4/2002 | Wentker et al. | 235/492 |
| 2002/0046342 A1 * | 4/2002 | Elteto et al. | 713/185 |
| 2002/0065625 A1 * | 5/2002 | Xydis | 702/127 |
| 2002/0066042 A1 * | 5/2002 | Matsumoto et al. | 713/202 |
| 2002/0069030 A1 * | 6/2002 | Xydis | 702/176 |
| 2002/0089410 A1 | 7/2002 | Janiak et al. | |
| 2002/0091921 A1 * | 7/2002 | Kunzinger | 713/153 |
| 2002/0095587 A1 * | 7/2002 | Doyle et al. | 713/186 |
| 2002/0145051 A1 * | 10/2002 | Charrin | 235/492 |
| 2002/0169975 A1 | 11/2002 | Good | |
| 2002/0171546 A1 * | 11/2002 | Evans et al. | 340/540 |
| 2003/0005300 A1 * | 1/2003 | Noble et al. | 713/172 |
| 2003/0041244 A1 * | 2/2003 | Buttyan et al. | 713/172 |
| 2003/0154375 A1 | 8/2003 | Yang | |
| 2004/0054717 A1 * | 3/2004 | Aubry et al. | 709/203 |
| 2004/0088567 A1 * | 5/2004 | Lamotte | 713/200 |
| 2005/0033702 A1 * | 2/2005 | Holdsworth | 705/67 |
| 2005/0033703 A1 * | 2/2005 | Holdsworth | 705/67 |
| 2005/0044385 A1 * | 2/2005 | Holdsworth | 713/185 |
| 2005/0044393 A1 * | 2/2005 | Holdsworth | 713/200 |
| 2005/0055452 A1 * | 3/2005 | Suzuki et al. | 709/229 |
| 2005/0071282 A1 * | 3/2005 | Lu et al. | 705/64 |
| 2005/0138421 A1 * | 6/2005 | Fedronic et al. | 713/201 |
| 2007/0245148 A1 * | 10/2007 | Buer | 713/182 |
| 2011/0252466 A1 * | 10/2011 | Le Saint et al. | 726/9 |

FOREIGN PATENT DOCUMENTS

| | | |
|---|---|---|
| EP | 0733971 | 9/1996 |
| EP | 0737907 | 10/1996 |
| EP | 0913979 | 5/1999 |
| EP | 0949595 | 10/1999 |
| EP | 0957651 | 11/1999 |
| EP | 1061482 | 12/2000 |
| EP | 1128335 | 8/2001 |
| EP | 1132800 | 9/2001 |
| FR | 2695364 | 3/1994 |
| FR | 2738436 | 3/1997 |
| JP | 2001249889 | 9/2001 |
| WO | 9857510 | 12/1998 |
| WO | 0049820 | 8/2000 |
| WO | 0117310 | 3/2001 |
| WO | 0198876 | 12/2001 |
| WO | 0219664 | 3/2002 |
| WO | 02089444 | 11/2002 |
| WO | 02091316 | 11/2002 |

OTHER PUBLICATIONS

"Microsoft Windows 2000 Server, The Essential of Replacing the Microsoft Graphical Identification and Authentication Dynamic Link Library," Hutx et al., Microsoft Corporation, Jun. 2001, 34 pages total.

"Understanding the Layers of Wireless LAN Security & Management," AirDefense, 2003, 6 pages total.

"OpenCard Framework—General Information Web Document," IBM, 2nd Edition, Oct. 1998, 24 pages total.

"OpenCard Framework 1.2—Programmer's Guide," IBM, 4th Edition, Dec. 1999, 93 pages total.

"OpenCard and PC/SC—Two New Industry Initiatives for Smart Cards," Seliger F., 13 pages total.

"M.U.S.C.L.E, Movement for the Use of Smart Cards in a Linux Environment," http://www.linuxnet.com/index.html, Dec. 10, 2003, 1 page total.

"M.U.S.C.L.E, Movement for the Use of Smart Cards in a Linux Environment," http://www.linuxnet.com/apps.html, Dec. 10, 2003, 1 page total.

"M.U.S.C.L.E, Movement for the Use of Smart Cards in a Linux Environment," http://www.linuxnet.com/software.html, Dec. 10, 2003, 1 page total.

"Interoperability Specification for ICCs and Personal Computer Systems," Part 1, "Introduction and Architecture Overview," PC/SC workgroup, Revision 1.0, Dec. 1997, 21 pages total.

"Interoperability Specification for ICCs and Personal Computer Systems," Part 2, "Interface Requirements for Compatible IC Cards and Readers," PC/SC workgroup, Revision 1.0, Dec. 1997, 22 pages total.

"Interoperability Specification for ICCs and Personal Computer Systems," Part 3, "Requirements for PC-Connected Interface Devices," PC/SC workgroup, Revision 1.0, Dec. 1997, 23 pages total.

"Interoperability Specification for ICCs and Personal Computer Systems," Part 4, "IFD Design Considerations and Reference Design Information," PC/SC workgroup, Revision 1.0, Dec. 1997, 22 pages total.
"Interoperability Specification for ICCs and Personal Computer Systems," Part 5, "ICC Resource Manager Definition," PC/SC workgroup, Revision 1.0, Dec. 1997, 24 pages total.
"Interoperability Specification for ICCs and Personal Computer Systems," Part 6, "ICC Searvice Provider Interface Definition," PC/SC workgroup, Revision 1.0, Dec. 1997, 41 pages total.
"Interoperability Standards for ICCs and Personal Computer Systems," Part 7, "Application Domain and Developer Design Considerations," PC/SC workgroup, Revision 1.0, Dec. 1997, 17 pages total.
"Interoperability Specification for ICCs and Personal Computer Systems," Part 8, "Recommendations for ICC Security and Privacy Devices," PC/SC workgroup, Revision 1.0, Dec. 1997, 42 pages total.
"PC/SC Workgroup Specification Overview," http://www.pcscworkgroup.com/specifications/SpecificationsOverview.html, Dec. 10, 2003, 2 pages total.
"PPP EAP TLS Authentication Protocol," Network Working Group, Request for 2716, Adoba, et al., Oct. 1999, 23 pages total.
"PPP Extensible Authentication Protocol (EAP)," Network Working Group, Request for comments 2284, Blunk, et al., Mar. 1998, 15 pages total.
"Ensure Technologies: How Xyloc Works," http://www.ensuretech.com/products/technology/technology.html, Dec. 10, 2003, 4 pages total.
Dermot McGrath "Even With Its Drawbacks Bluetooth Could Be One Protocol That Lives Up to Its Hype," Microtimes Magazine, Mar. 26, 2001.
Mary Behr, et al., "Choose Your Weapon," PC Magazine, Apr. 24, 2001.
"Strong Authentication Using a Mobile Phone as a Security Token," Connectotel, Ltd., 1999-2001.
International Search Report dated Oct. 18, 2002.
R. C. Ferreira; "The Smart Card: A high security tool in EDP", Philips Telecommunication Review, Philips Telecommunicatie Industrie N.V. Hilversum, NL, vol. 47, No. 3, Sep. 1, 1989, pp. 1-19. XP000072642.
A. Amegah, et al., "An Access Controller for Java Card", Gemplus, Security Technology Department, Jun. 20-21, 2001, pp. 1-8.
"Java Card™ 2.2 Application Programming Interface," Sun Microsystems, Inc., Palo Alto, CA, Revision 1.1, Sep. 2002, pp. i-195.
Java Card™ 2.2 Runtime Environment (JCRE) Specification,: Sun Microsystems, Inc., Palo Alto, CA, Jun. 2002, pp. i-274.
T. Schwarzhoff, et al., "Government Smart Card Interoperability Specification," National Institute of Standards and Technology, Technology Administration U.S. Department of Commerce, Version 2.1, Interagency Report 6887-2003 Edition, Jul. 16, 2003, 230 pages total.
"Background for the Government Interoperability Specification," Jun. 2002, 2 pages total.
P. Girard, et al., "Java Card or How to Cope with the New Security Issues Raised by Open Cards?," Gemplus Research Lab, Technical Report SM-99-02, Jun. 1999, 12 pages total.

D. Perovich, et al., "A Simple Methodology for Secure Object Sharing," pp. 1-7, Oct. 2000.
Dray, Jim, "The Government Smart Card Interoperability Specification," CardTech/SecurTech, Apr. 2002, 12 pages total.
Government Smart Card, Smart Card Standards and the Government Smart Card Interoperability Specification (GSC-IS), Apr. 24, 2002, pp. 1-15.
Menezes, A. J. et al., "Handbook of Applied Cryptography,", CRC Press Series on Discrete Mathematics and Its Applications, Boca Raton, FL, CRC Press, SP002283799, pp. 489-508.
European Search Report dated Jun. 9, 2004.
FIPS PUB 140-2, "Security Requirements For Cryptographic Modules," Information Technology Laboratory, National Institute of Standards and Technology, May 25, 2001, pp. i-55.
Office Action dated Feb. 5, 2007 in U.S. Appl. No. 10/402,960.
European Search Report dated Dec. 1, 2005.
Deutche Telecom AG, "Das TeleSec LineCrypt L Fur Sinchere Netzwerkverbindungen," XP002207127, pp. 5-39, Apr. 14, 2000.
European Search Report dated Jan. 2, 2007.
"Global Platform Card Specification v2.0.1", [Online] XP002362776, www.globalplatform.org/specifications/archived/card-tech-201.zip, Apr. 7, 2000, 180 pages.
Sun Microsystems: "Java Card 2.1.1 Runtime Environment (JCRE) Specification", Internet Citation, XP002167364, ftp.java.sun.com/pub/javacard/adjfklad-211/java_card_kit-2_1_1-doc.zip, May 18, 2000, pp. i-x and 1-62.
S. Motre: "Formal Model and Implementation of the Java Card Dynamic Security Policy", Technical Report SM-99-09, XP002267048, Jul. 1999, 13 pages.
European Search Report dated Jan. 12, 2005.
Hassler, et al., "Opencard Framework Application Development Using Java to Build Platform-Independent Smartcards," Dr. Dobb's Journal, M& T Publication, Redwood City, CA, vol. 309, XP001001494, pp. 70, 72, 74-76, Feb. 2000.
Shanley, "Plug and Play System Architecture," Mindshare Inc., Plug and Play System Architecture, System Architecture Series, XP002042679, pp. 14-15, 43-50, 1995.
Shanley, "Plug and Play System Architecture," Mindshare Inc., Addision Wesley, XP002313206, 7 pages total, 1995.
Zao, et al., "Domain Based Internet Security Policy Management," Proceedings Darpa Information Survivability Conference and Exposition, XP002276485, pp. 41-53 Dec. 31, 1999.
Abrams, et al., "New Thinking About Information Technology Security," Computers & Security, Elsevier Science Publishers, Amsterdam, vol. 14, No. 1, XP004001979, pp. 69-81, 1995.
European Search Report dated Apr. 12, 2005.
European Search Report dated Apr. 7, 2005.
European Search Report dated May 27, 2005.
Deutche Telecom AG: "Das TeleSec LineCrypt L Fur Sichere Netzwerkverbindungen," Linecrypt L Benutzerhandbuch, XP002207127, pp. 5-39, Apr. 14, 2000.
Office Action dated Aug. 2, 2006 in U.S. Appl. No. 10/424,783.
Deutche Telecom AG: "Das TeleSec LineCrypt L Fur Sichere Netzwerkverbindungen," Linecrypt L Benutzerhandbuch, XP-002207127, pp. 5-38, Apr. 14, 2000.
Office Action dated Oct. 5, 2006 in U.S. Appl. No. 10/425,028.

* cited by examiner

UNIVERSAL SECURE MESSAGING FOR REMOTE SECURITY TOKENS

CROSS-REFERENCE TO RELATED APPLICATIONS

This application is a continuation in part to U.S. patent applications:

Ser. No. 10/424,783, filed Apr. 29, 2003, entitled, "Universal Secure Messaging For Cryptographic Modules," now abandoned and Ser. No. 09/880,795, filed Jun. 15, 2001, entitled, "Method, System And Apparatus For A Portable Transaction Device" now abandoned.

This application is a related application of the application, entitled "Intelligent Remote Device," by inventors named Eric Le Saint and Dominique Fedronic and which was filed on Dec. 22, 2003.

The three aforementioned co-pending US patent applications are herein incorporated by reference in their entirety.

FEDERALLY SPONSORED RESEARCH AND DEVELOPMENT

Not Applicable.

REFERENCE TO A MIRCORFICHE APPENDIX

Not Applicable.

FIELD OF INVENTION

The present invention relates generally to a data processing system, method and computer program product and more specifically to a secure end-to-end wireless communications connection between a security token enabled computer system and an intelligent remote device having a security token operatively coupled thereto.

BACKGROUND

In high security operating environments, the US National Institute of Standards and Technology (NIST) specifies in FIPS PUB 140-2, "Security Requirements For Security tokens," for security levels 3 and 4 that critical security parameters (CSP) such as authentication data, passwords, PINs, CSPs, biometric samples, secret and private cryptographic keys be entered into or output from a security token in an encrypted form, generally using some form of physical and/or logical trusted path or secure messaging channel to prevent interception of the critical security parameters.

The security tokens referred to in this specification include hardware based security devices such as cryptographic modules, smart cards, integrated circuit chip cards, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

Attempts at providing a physical trusted path include the use of cryptographic hardware devices installed between input devices such as the keyboard and possibly the mouse. An example of such a cryptographic interface device is disclosed in U.S. Pat. No. 5,841,868 to Helbig. However, the hardware expenditures and added administrative burden greatly increases the cost of the computer system.

In another approach, U.S. Pat. No. 4,945,468 to Carson, et al., a trusted path is generated by providing a new virtual terminal window which allows secure entry of CSPs. The new virtual terminal window is effectively isolated from other running processes. This method is a reasonably secure approach but does not extend the trusted path to peripheral security devices such as cryptography modules, security tokens and biometric scanners.

In yet another approach, US patent application 2002/0095587 to Doyle, et al. discloses a wireless SSL or equivalent connection which utilizes negotiated time-limited cryptography keys to maintain a chain of trust between interconnected security devices. However, the mechanism disclosed relies heavily on multiple public key cryptography key pairs which is difficult to maintain and may reduce overall performance due to relatively slow transaction processing when employed using a smart card. In addition, negotiation of time-limited cryptography keys relies on devices containing a system clock for changing of cryptographic keys. Smart cards and like devices do not include system clocks and thus are reliant of their host for providing event timing which may introduce security concerns when the host is not trusted.

Cryptographic mechanisms are available in the relevant art which could be adapted to encrypt an incoming CSP with a cryptographic key for secure transport through a security token enabled and eventual decryption by a security executive installed within the security token. However, the cryptographic mechanism employed by the security token enabled computer system must provide a sufficient level of security to prevent interception of the cryptographic keys used in encrypting the CSP and furthermore limits vulnerability to a replay type attack.

Another common vulnerability in the relevant art relates to the lack of ability to bind a CSP to a session, which potentially allows an unlocked security token to be accessed by an unauthorized entity. To address this potential vulnerability, the CSP is typically cached or stored and presented by software to the security token each time access is required. The cached or stored CSPs are likewise vulnerable to interception or compromise by an unauthorized entity.

Therefore, it would be highly advantageous to provide a secure CSP transport system which limits an intruder's ability to intercept a cryptographic key during wireless communications sessions, is relatively invulnerable to a replay type attack, minimizes requests for user input of CSPs already provided within a session and does not store or otherwise cache a CSP.

SUMMARY

This invention addresses the limitations described above and provides an efficient secure end-to-end communications connection to securely exchange information between a security token enabled computer system and an intelligent remote device having a security token operatively coupled thereto. The method portion of the invention comprises the steps of performing a first security transaction which authenticates a security token to a security token enabled computer system, establishing a secure communications connection between the security token and the security token enabled computer system which incorporates a shared symmetric key set generated during the first security transaction, assigning at least one key from the shared symmetric key set to a dedicated communications channel accessible to the security token, and performing a second security transaction which authenticates a user to said security token.

In a related embodiment of the invention, additional steps are performed for signaling an affirmative result to the security token enabled computer system if the second security transaction is successful. In a related embodiment of the invention, the second security state is required before the secure communications connection is available for use by said security token.

The first security transaction is accomplished using a challenge/response protocol which incorporates an asymmetric key pair. A challenge is generated by the security token enabled computer system and encrypted with the public key associated with the security token.

The encrypted challenge is then sent to the security token. The security token decrypts the challenge using the private key counterpart to the public key and returns the clear text challenge to the security token enabled computer system for verification.

The public key is transferred to the security token enabled computer system by way of a digital certificate as part of the establishing the wireless communications connection.

The second security transaction authenticates the user to the security token by the user's critical security parameter which is provided directly or indirectly to the security token via the intelligent remote device. Once the second security transaction has been successfully completed the user is allowed access to one or more secure resources associated with the security token, security token enabled computer system or both.

In related embodiments of the invention, security states are maintained by the security token and security token enabled computer system. The security states are set by the successful completion of the first and second security transactions.

The secure communications connection is established by generating on the security token enabled computer system, a shared symmetric key set, encrypting one of the generated symmetric keys with the public key, sending the encrypted symmetric key to the security token, decrypting the symmetric key with the counterpart private key and assigning the decrypted symmetric key to a dedicated communications channel. The dedicated communications channel prevents the number of wireless secure communications connections with the security token from exceeding a predetermined limit. The predetermined limit is usually set to 1.

In another embodiment of the invention, user feedback is provided by the intelligent remote device which prompts the user to select either a local or remote authentication transaction and provide the critical security parameter.

In another embodiment of the invention authentication of the user is inhibited if outside a predefined range of a proximity sensor coupled to the security token enabled computer system.

In yet another embodiment of the invention, user sensory feedback is provided by the security token enabled computer system which indicates a remote authentication transaction is in progress. The user sensory feedback includes visual, tactile, aural or vibratory feedback.

A first systematic embodiment of the invention comprises a security token enabled computer system in wireless communications with an intelligent remote device having an operatively coupled security token thereto. The security token enabled computer systems includes a first security transaction means for at least authenticating the security token to the security token enabled computer system, and a first secure communications connection means for at least establishing a cryptographically encoded link between the security token enabled computer system and the security token. The first security transaction means includes a challenge/response protocol means and an asymmetric cryptography means. The first secure communications connection means includes a symmetric key set generation means and a secure symmetric key exchange means.

In a related embodiment of the invention, the security token enabled computer system further includes a first secure access means for allowing a user access to one or more secure resources following a receipt of an affirmative signal.

In another related embodiment of the invention, successful execution of the first security transaction means sets a first computer system security state and receipt of the affirmative result signaling sets a second computer system security state associated with the security token enabled computer system.

The intelligent remote device includes a security token interface means for at least operatively coupling the security token to the intelligent remote device, and a user interface means for at least receiving and routing a critical security parameter provided by the user to the security token interface means. The user interface means includes conditional means for conditionally receiving the critical security parameter. The conditional means is intended to limit or prevent receiving the critical security parameter until the cryptographically encoded link is established. The security token interface means includes security token communications means and electromagnetic power transfer means.

The security token includes a secure communications connection means for at least establishing the cryptographically encoded link in conjunction with the first secure communications connection means, a dedicated communications channel means for preventing a concurrent cryptographically encoded link from being established with the security token, a second security transaction means for at least authenticating the user to the security token using at least the critical security parameter and an affirmative signaling means for sending an affirmative signal to the security token enabled computer system following a successful completion of the second security transactions means. In an embodiment of the invention, the dedicated communications channel means includes a unique channel identifier means which is addressable by the security token enabled computer system.

In a related embodiment of the invention, establishment of the cryptographically encoded link sets a first token security state and successful execution of the second security transaction means sets a second token security state. In a related embodiment of the invention, the second security state is required before the secure communications connection is available for use by the security token.

A second systematic embodiment of the invention comprises a security token enabled computer system in processing communications with an intelligent remote device and a security token coupled to the intelligent remote device. The security token enabled computer system includes a first processor, a first memory coupled to the first processor, at least one remote authentication application operatively stored in a first portion of the first memory having logical instructions executable by the first processor to authenticate the security token, establish a secure end-to-end communications connection with the security token and allow a user access to one or more secure resources following a receipt of an affirmative signal sent from the security token.

The security token enabled computer system further includes a first wireless transceiver functionally coupled to the first processor and a public key associated with the security token retrievably stored in a second portion of the first memory.

The at least one remote authentication application further includes logical instructions executable by the first processor to generate a symmetric key set and perform a secure key exchange with the security token.

The intelligent remote device includes a second processor, a second memory coupled to the second processor, a security token interface coupled to the second processor, a user interface coupled to the second processor and at least one remote device interface application operatively stored in a portion of the second memory. The at least one remote device interface application includes logical instructions executable by the second processor to emulate a security token device interface locally coupled to at least the security token enabled computer system and conditionally receive and route a critical security parameter provided by the user via the user interface to the security token. The intelligent remote device further includes a second wireless transceiver functionally coupled to the second processor.

The communications and electromagnetic power interface includes inductive means, capacitive means or electric contact means to operatively couple the security token to the intelligent remote device. The at least one remote device interface application further includes logical instructions executable by the second processor to prevent receiving the critical security parameter from the user before establishment of the secure end-to-end communications connection.

The security token includes at least a third processor, a third memory coupled to the at least a third processor, a communications and electromagnetic power interface coupled to the at least a third processor and the security token interface and at least one token remote authentication application operatively stored in a first portion of the third memory.

The at least one token remote authentication application includes logical instructions executable by the at least a third processor to establish the secure end-to-end communications connection in conjunction with the security token enabled computer system, restrict the secure end-to-end communications connection to a single wireless secure communications connection, authenticate the user and send the affirmative signal to the security token enabled computer system, if the user is successfully authenticated. The security token further includes an private key retrievably stored in a second portion of the third memory and a reference critical security parameter retrievably stored in a third portion of the third memory. The private key is the counterpart to the public key. The user is authenticated by the at least one token remote authentication application by comparing the user's provided critical security parameter to the reference critical security parameter.

The restriction to the secure end-to-end communications connection is applied to a dedicated communications channel controlled by the at least one token remote authentication application. The dedicated communications channel includes a unique identifier addressable by the security token enabled computer system.

The public and private keys are incorporated into a challenge/response protocol used to authenticate the security token to the security token enabled computer system and are further used to perform a secure symmetric key exchange from the security token enabled computer system to the security token.

In another embodiment of the invention, a proximity sensor is coupled to the security token enabled computer system which inhibits either authentication or use of the secure communications channel if the security token is outside of a predefined range from the security token enabled computer system.

In a final embodiment of the invention, a computer program product is provided. The computer program product is embodied in a tangible form readable by a security token processor and includes executable instructions stored thereon for causing the security token processor to utilize one or more security token emulation services provided by an intelligent remote device processor, establish a secure end-to-end communications connection in conjunction with a security token enabled computer system processor, restrict the secure end-to-end communications connection to a single wireless secure communications connection, authenticate a user and send an affirmative signal to the security token enabled computer system processor if the user is successfully authenticated.

The computer program product further includes executable instructions stored thereon for causing the security token enabled computer system processor to authenticate the security token, establish the secure end-to-end communications connection with the security token, and allow a user access to one or more secure resources following a receipt of the affirmative signal sent from the security token.

The computer program product further includes executable instructions stored thereon for causing the intelligent remote device processor to provide the one or more security token emulation services to the security token processor, and receive and route a critical security parameter provided by the user via the user interface to the security token.

The tangible form of the computer program product includes magnetic media, optical media or logical media stored in a code format comprising byte code, compiled, interpreted, compilable and interpretable.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined by the claims.

DETAILED DESCRIPTION

This present invention provides an anonymous secure end-to-end communications connection which allows an intelligent remote device to emulate a locally connected security token device without requiring an actual physical connection to a security token enabled computer system. The anonymous secure end-to-end communications connection is established over a wireless communications network or link. The applications are envisioned to be programmed in a high level language using such as Java™, C++, C#, C or Visual Basic™.

Figure 1:
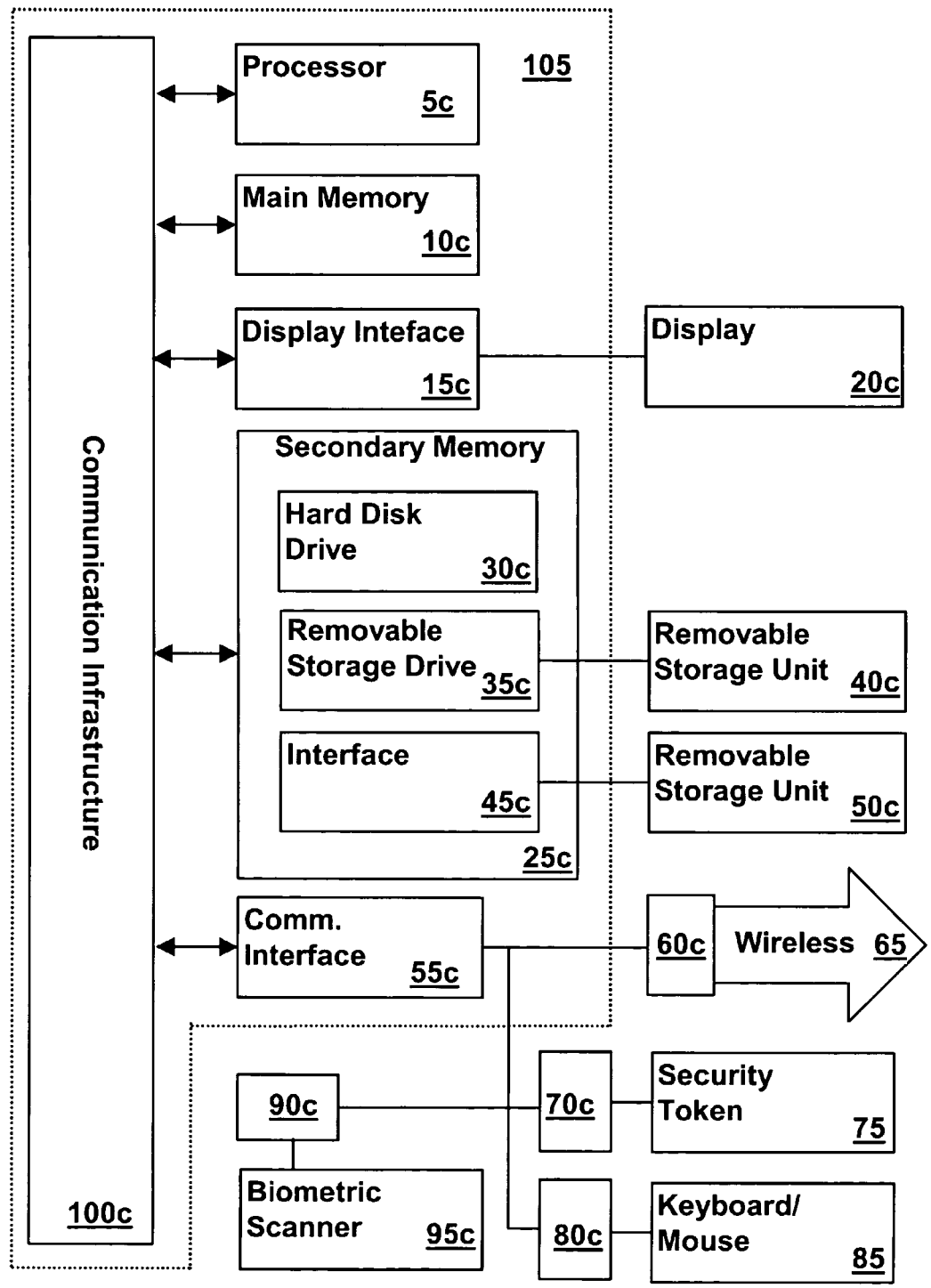
FIG. 1—is a generalized block diagram of a security token enabled computer system.

Referring to FIG. 1, a block diagram of a security token enabled computer system 105 is depicted.

The security token enabled computer system 105 includes a processor 5c, a main memory 10c, a display 20c electrically coupled to a display interface 15c, a secondary memory subsystem 25c electrically coupled to a hard disk drive 30c, a removable storage drive 35c electrically coupled to a removable storage unit 40c and an auxiliary removable storage interface 45 electrically coupled to an auxiliary removable storage unit 50c.

A communications interface 55c subsystem is coupled to a wireless transceiver 60c and a wireless network or link 65, an optional security token 75 electrically coupled to a security token interface 70c and a user input interface 80c including a mouse and a keyboard 85, an optional biometric scanner 95c electrically coupled to an optional biometric scanner interface 90c and an optional proximity sensor 115c coupled to the communications interface 55c. The proximity sensor 115c prohibits remote authentications to be performed when a security token 75r (FIG. 1A) is not within either a predefined distance from the proximity sensor 115c or within sensor range of the proximity sensor 115c. An example of suitable proximity systems adaptable for use in the invention is available from Ensure Technologies (Xyloc), 3526 West Liberty Road, Suite 100, Ann Arbor, Mich. 48103. The technical bases for the Xyloc proximity detection systems are disclosed in US patents and patent applications U.S. Pat. Nos. 6,456,958, 6,307,471, 6,070,240, U.S. 20020104012A1, U.S. 20020069030A1, U.S. 20020065625 all assigned to Ensure Technologies and all herein incorporated by reference.

Figure 1A:
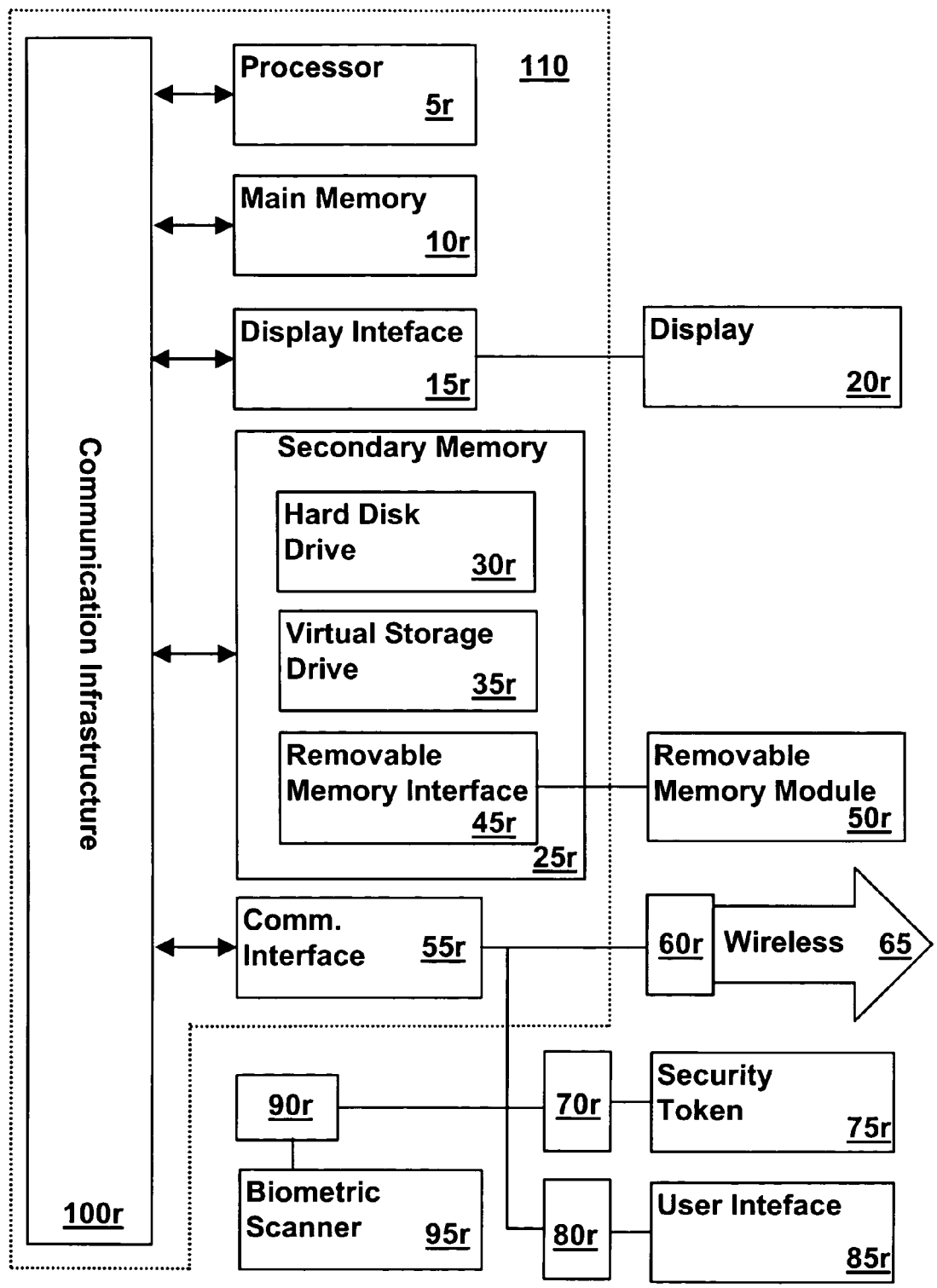
FIG. 1A—is a generalized block diagram of an intelligent remote device.

The processor 5c, main memory 10c, display interface 15c secondary memory subsystem 25c and communications interface system 55c are electrically coupled to a communications infrastructure 100c. The security token enabled computer system 105 includes an operating system, at least one remote authentication application, other applications software, cryptography software capable of performing symmetric and asymmetric cryptographic functions, secure messaging software and device interface software. Referring to FIG. 1A, a block diagram of an intelligent remote device 110 is depicted. The an intelligent remote device 110 includes a processor 5r, a main memory 10r, a display 20r electrically coupled to a display interface 15r, a secondary memory subsystem 25r electrically coupled to an optional hard disk drive 30r, a virtual storage drive 35r and a removable memory module 50r electrically coupled to a removable memory module interface 45r.

A communications interface 55r subsystem is coupled to a wireless transceiver 60r and a wireless network or link 65, a security token 75 electrically coupled to a security token interface 70r and a user input interface 80r including a mouse and a keyboard 85r, and an optional biometric scanner 95r electrically coupled to an optional biometric scanner interface 90r.

The processor 5r, main memory 10r, display interface 15r secondary memory subsystem 25r and communications interface system 55r are electrically coupled to a communications infrastructure 100r. The intelligent remote device includes an operating system, at least one remote device interface application, other applications software, cryptography software capable of performing symmetric and asymmetric cryptographic functions, secure messaging software and device interface software.

Figure 1B:
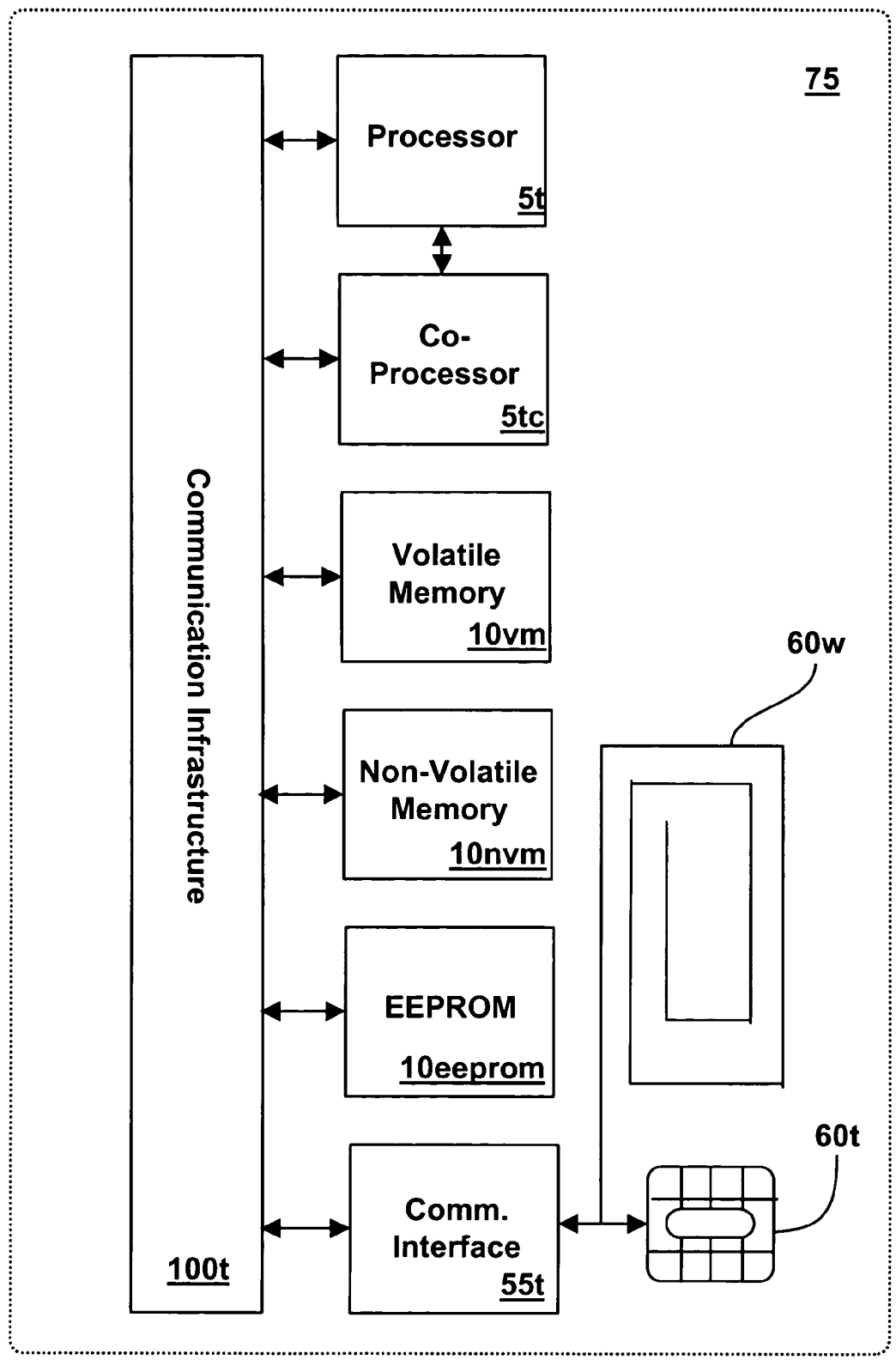
FIG. 1B—is a generalized block diagram of a security token

Referring to FIG. 1B, a block diagram of the security token 75 is depicted. The security token 75 includes a wireless, optical and/or electrical connection means 60t, 60w compatible with the security token interfaces 70c, 70r, a processor 5t, an optional cryptographic co-processor 5tc coupled to the processor 5t, volatile memory 10vm, non-volatile memory 10nvm, an electrically erasable programmable read only memory (EEPROM) 10eeprom and a communications interface 55t coupled to the connection means 60t.

The processor 5t, optional cryptographic co-processor 5tc, volatile memory 10vm, non-volatile memory 10nvm, electrically erasable programmable read only memory (EEPROM) 10eeprom and communications interface 55t are electrically coupled to a communications infrastructure 100t. The EEPROM further includes a runtime operating environment, cryptography extensions incorporated into the operating system and capable of performing symmetric and asymmetric cryptographic functions compatible with the intelligent remote device and security token enabled cryptography software, at least one token remote authentication application, one or more critical security parameter protected secure resources coupled to the at least one token remote authentication application and a public key infrastructure (PKI) key pair functionally coupled to the at least one token remote authentication application.

The non-volatile memory 10nvm has operatively stored therein one or more reference critical security parameters which are verified against a user supplied critical security parameter by the at least one token remote authentication application to allow access to the one or more one or more critical security parameter protected secure resources.

Figure 2:
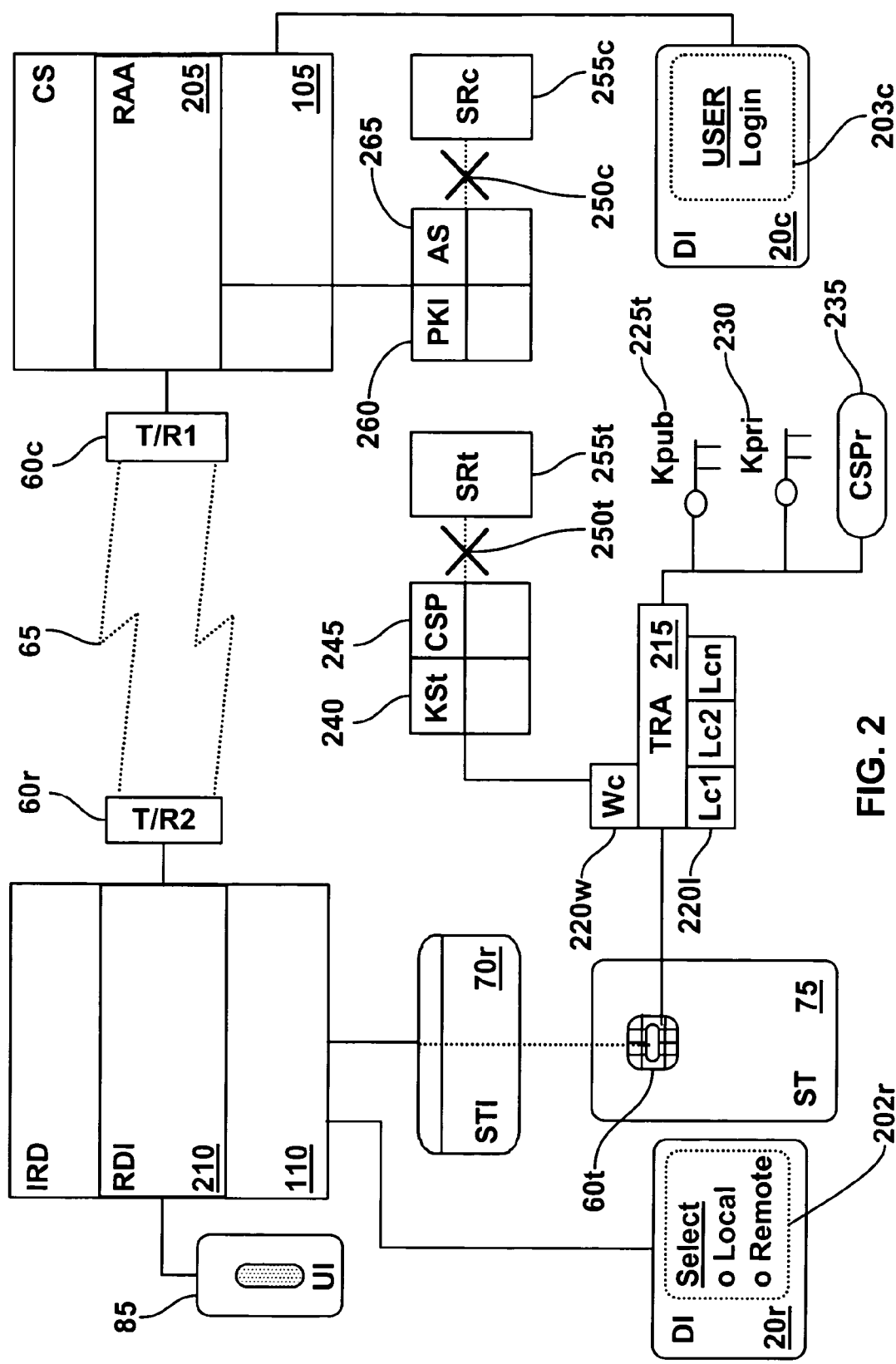
FIG. 2—is a detailed block diagram of one embodiment of the invention where a security token enabled computer system is in processing communications with a security token equipped intelligent remote device over a wireless link.

Referring to FIG. 2, a generalized arrangement of the invention is depicted. The invention includes an intelligent remote device IRD 110 in processing communications over a wireless link 65 with a security token enabled computer system 105. A security token ST 75 is operatively coupled to the intelligent remote device IRD 110 via a security token interface device STI 70r.

The intelligent remote device IRD 110 includes an operatively coupled wireless transceiver T/R2 60r, a security token interface STI 70r, a user input means UI 85 and a display DI 202r which provides a user with information related to available authentication options and authentication status.

The security token interface STI 70r includes optical, capacitive, inductive and direct electrical contact type interface devices and provides electromagnetic power and communications continuity with the intelligent remote device IRD 110. Lastly, at least one remote device interface application RDI 210 is installed in the intelligent remote device IRD 110.

The at least one remote device interface application RDI 210 is generally a middleware application which allows the intelligent remote device IRD 110 to emulate a local security token device peripheral coupled to the security token enabled computer system CS 105 without requiring an actual physical connection. When enabled, the at least one remote device interface application RDI 210 provides security token interface services for exchanging data with the security token enabled computer system, receiving a user's critical security parameter provided using the user interface UI 85r and routing the user's critical security parameter to the security token ST 75 for user authentication or verification.

The at least one remote device interface application RDI 210 further provides user prompts and feedback via a display DI 20r.

The security token ST 75 is operatively coupled to the security token interface device STI 70r by a connection means 60t and includes a public and a private key pair Kpub 225t, Kpri 230 and a reference critical security parameter CSPr 235 retrievably stored in the token memory. At least one token remote access application TRA 215 is likewise installed in the token memory.

The at least one token remote access application TRA 215 allows the security token ST 75 to establish a secure end-to-end communications connection in conjunction with the security token enabled computer system CS 105, restrict the secure end-to-end communications connection to a single wireless secure communications connection by way of a dedicated wireless communications channel Wc 220w, authenticate a user by comparing a user's provided critical security parameter to the reference critical security parameter CSPr 235 and optionally send an affirmative signal to the security token enabled computer system CS 105 if the user is successfully authenticated. Local communications channel Lc1, Lc2, Lcn 220 allows multiple communications sessions to be established when the ST 75 is locally connected to either the intelligent remote device IRD 110 or security token enabled computer system CS 105.

The dedicated wireless communications channel Wc 220w restricts the number of communications sessions which can be established remotely. The at least one token remote access application TRA 215 includes an authentication state table 240, 245 which requires fulfillment before access 250t is allowed to one or more secure token resource SRt 255t. In one embodiment of the invention, the communication session is not available to the security token ST 75 until the authentication state table 240, 245 is properly set by authentication of the user.

The security token enabled computer system 105 includes a wireless transceiver T/R1 compatible with the wireless transceiver T/R2 installed on the intelligent remote device IRD 110 and at least one remote access application RAA 205. The at least one remote access application RAA 205 is generally a middleware application which allows the security token enabled computer system CS 105 to authenticate the security token ST 75, establish the secure end-to-end communications connection with the security token ST 75 over the wireless link 65 and allow the user access 250c to one or more secure resources following a receipt of an affirmative signal sent from the security token ST 75. In another embodiment of the invention, the affirmative signal is optional.

In one embodiment of the invention, the at least one remote access application RAA 205 includes an authentication state table 260, 265 which requires fulfillment before access 250c is allowed to the one or more secure computer system resource SRc 255c. 105. The security token enabled computer system 105 further includes a display 20c which provides a user with information related at least to authentication status 203c.

The messaging protocol used to communicate with the security token ST 75 includes an ISO 7816 compliant communications protocol. Protocol conversion between higher level packet communications protocols and the lower level ISO 7816 communications protocol may be accomplished by either the remote access application RAA 205 installed on the security token enabled computer system CS 110 or by the remote device interface RDI 210 installed on the intelligent remote device IRD 110.

A secure arrangement for exchanging APDU commands and responses between the security token ST 75 and security token enabled computer system CS 105 is described in co-pending U.S. patent application Ser. No. 09/844,246, filed Apr. 30, 2001, entitled, "Method And System For Establishing A Remote Connection To A Personal Security Device," which is herein incorporated by reference in its entity.

Extensible authentication protocols (EAP) as described in the internet standards RFC 2284 or RFC 2716 may be incorporated into the communications connection as well.

The authentication state tables 240, 245, 260, 265 may be part of a pre-established set of security policies. In one embodiment of the invention, access requirements are determined by the security policies maintained within the security token ST 75 as is described in co-pending U.S. patent application Ser. No. 10/402,960 to a common assignee filed on Apr. 1, 2003, entitled "Uniform Framework for Security Tokens," and herein incorporated by reference.

Additional security policies may be combined with the security policies established for the security token as is described in co-pending U.S. patent application Ser. No. 10/425,028 to a common assignee filed on Apr. 29, 2003, entitled "Uniform Modular Framework For A Host Computer System," and likewise herein incorporated by reference.

Figure 2A:
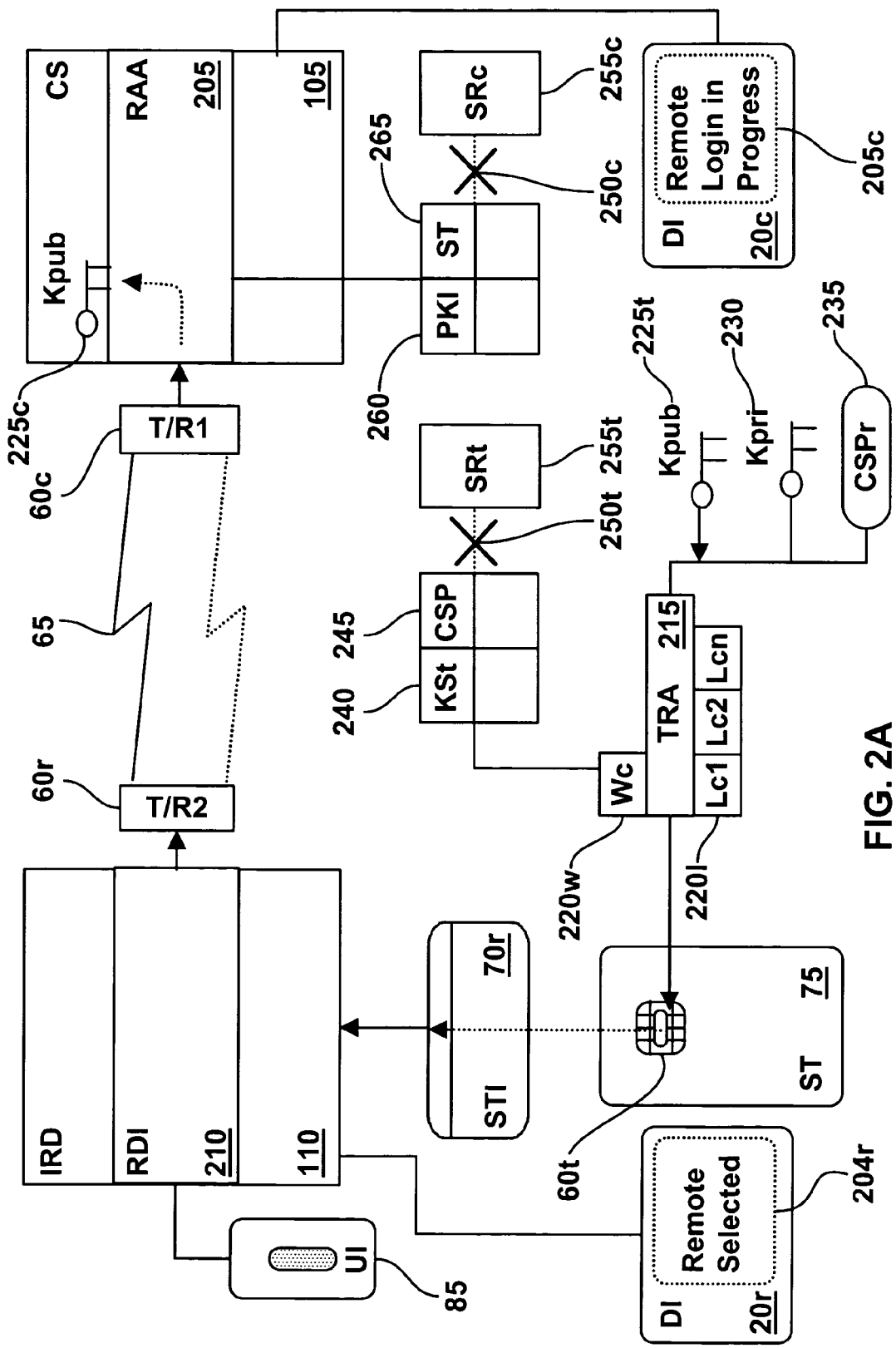
FIG. 2A—is a detailed block diagram of the invention where an public key is transferred to the security token enabled computer system.

Referring to FIG. 2A, the secure end-to-end communications connection is initiated by a user selecting a remote authentication option 204r from the display DI 20r associated with the intelligent remote device IRD 110. The at least one token remote access application 215 causes the public key Kpub 225t to be sent to the security token enabled computer system CS 105 from the security token ST 75.

In an alternate embodiment of the invention, no user interaction is required to initiate the secure end-to-end communications connection. In the alternate embodiment of the invention, the communications handshaking between the two wireless transceivers T/R1 60c, T/R2 60r automatically causes execution of the at least one token remote access application 215.

In the preferred embodiment of the invention, a public key Kpub 225t or duplicate thereof. Kpub 225c, is sent to the security token enabled computer system CS 105 in an X.509 certificate where it is retrievably stored. The public key Kpub 225c will be used to authenticate the security token ST 75 to the security token enabled computer system CS 105 and to perform a secure symmetric key exchange between the security token enabled computer system CS 105 and security token ST 75.

Figure 2B:
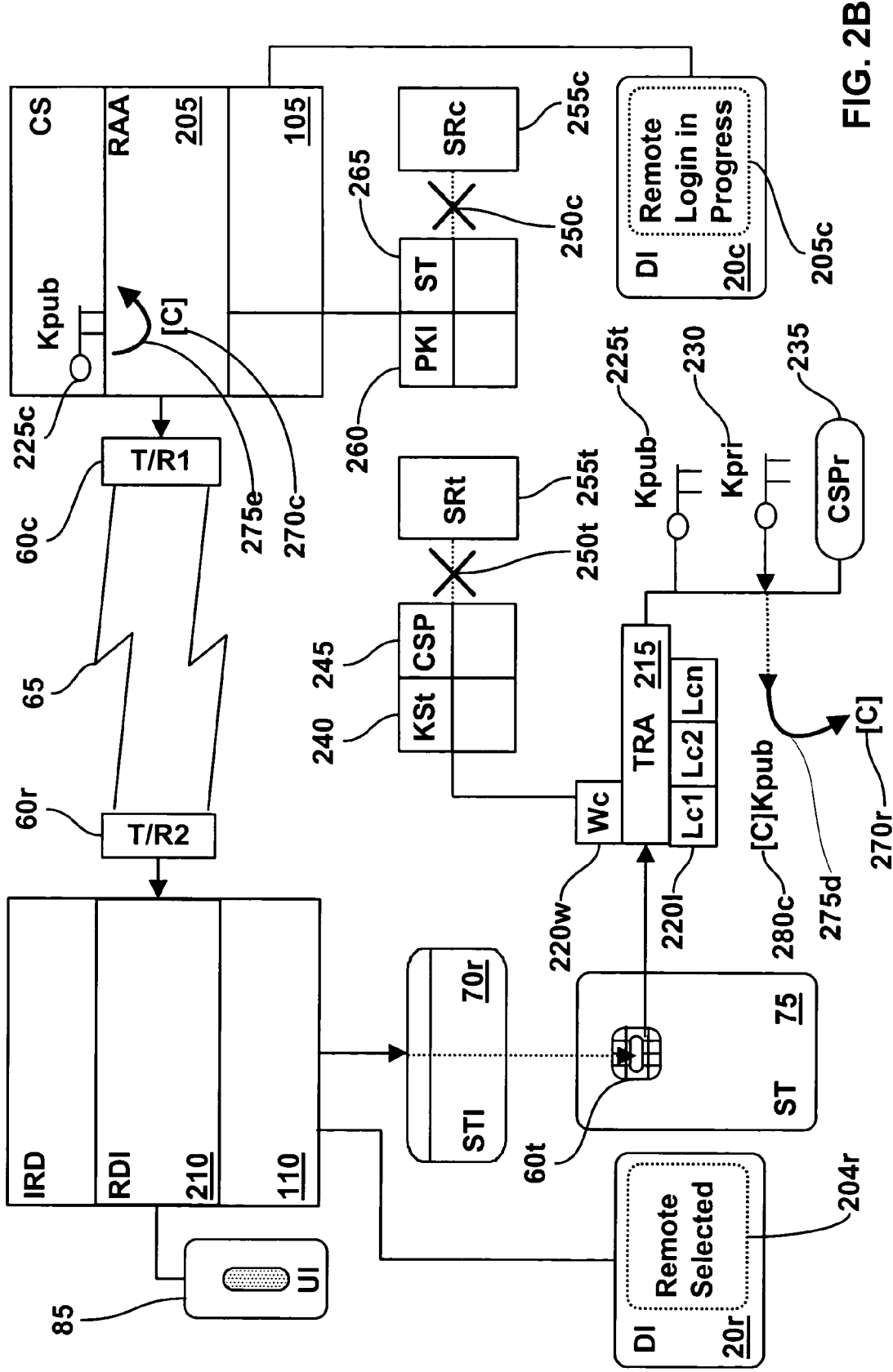
FIG. 2B—is a detailed block diagram of the invention where the security token receives an encrypted challenge generated by the security token enabled computer system as an initial part of an authentication challenge/response protocol.

Referring to FIG. 2B, the receipt of the public key Kpub 225c causes the at least one remote access application to generate a challenge [C] 270c which is then encrypted 275e using the public key Kpub 225c and the resulting cryptogram [C]Kpub 280c is then sent over the wireless link 65 to the security token ST 75.

The display DI 20c associated with the security token enabled computer system CS 105 provides user feedback 205c that a remote authentication transaction has been initiated. The at least one token remote access application TRA 215 receives and decrypts 275d the cryptogram [C]Kpub 280c using the counterpart private key Kpri 230 generating the token clear text response [C] 270r to the challenge.

Figure 2C:
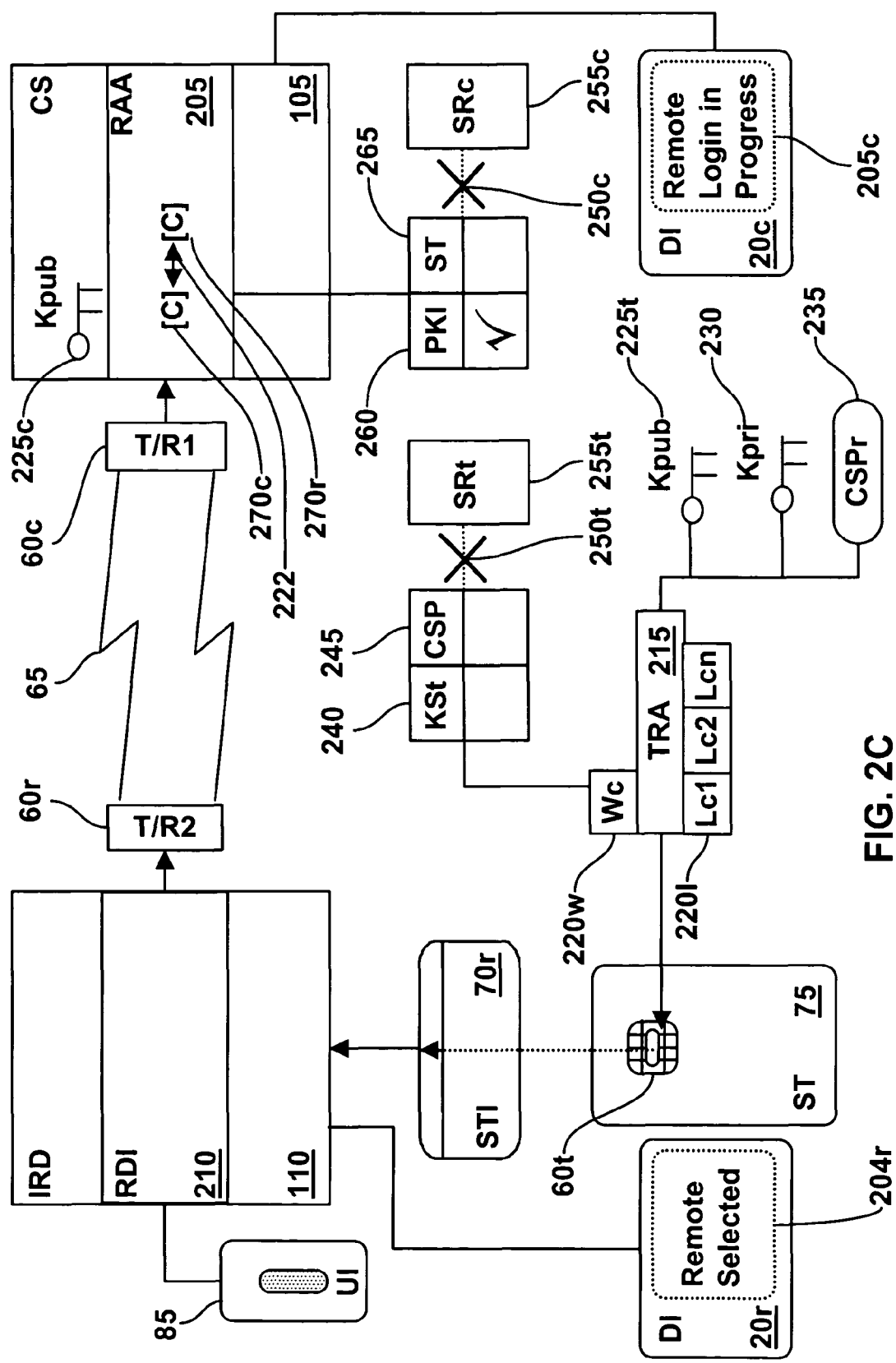
FIG. 2C—is a detailed block diagram of the invention where the security token returns the clear text challenge to the security token enabled computer system as a final part of the authentication challenge/response protocol.

Referring to FIG. 2C, the token response to the challenge [C] 270r is returned to the security token enabled computer system CS 105 where the remote access application RAA 205 compares 222 the returned response [C] 270r to the initial challenge [C] 270c. If the token response [C] 270r matches the initial challenge [C] 270c, the PKI authentication part of the computer systems authentication state table is fulfilled 260. If the security token ST 75 fails this first authentication transaction processing ends and a new attempt to establish the secure end-to-end communications connection will need to be performed.

Figure 2D:
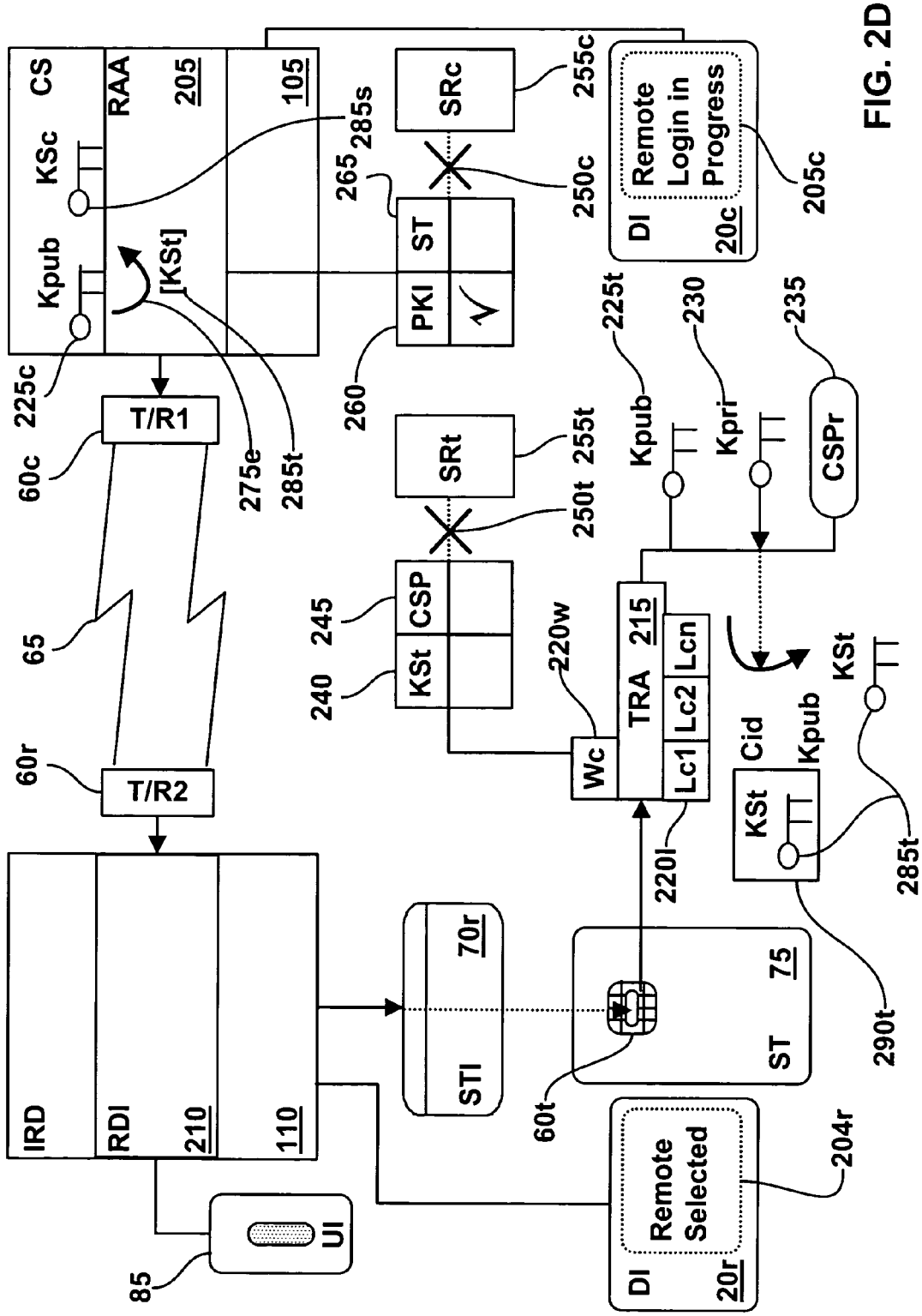
FIG. 2D—is a detailed block diagram of the invention where a symmetric key set is generated and a secure key exchange is performed between the security token enabled computer system and the security token.

Referring to FIG. 2D, a first part of the anonymous secure end-to-end communications connection is initiated by the remote access application RAA 205 generating a symmetric key set. The symmetric key sets KSt 285t and KSc 285s are identical symmetric keys generated or derived from a random number preferably having sufficient bit strength of at least 64 bits to assure adequate security and performance.

The at least one remote access application RAA 205 encrypts 275e one of the symmetric keys KSt 285t using the public key Kpub 225c and the resulting cryptogram [KSt] Kpub 290t is then sent over the wireless link 65 to the security token ST 75. In one embodiment of the invention, a channel identifier Wc 220w is included in a message header associated with the cryptogram which specifies the dedicated communications channel in which the symmetric key is to be used. The at least one token remote access application TRA 215 receives and decrypts 275d the cryptogram [KSt]Kpub 290t using the counterpart private key Kpri 230 restoring the token's shared symmetric key KSt 285t.

Figure 2E:
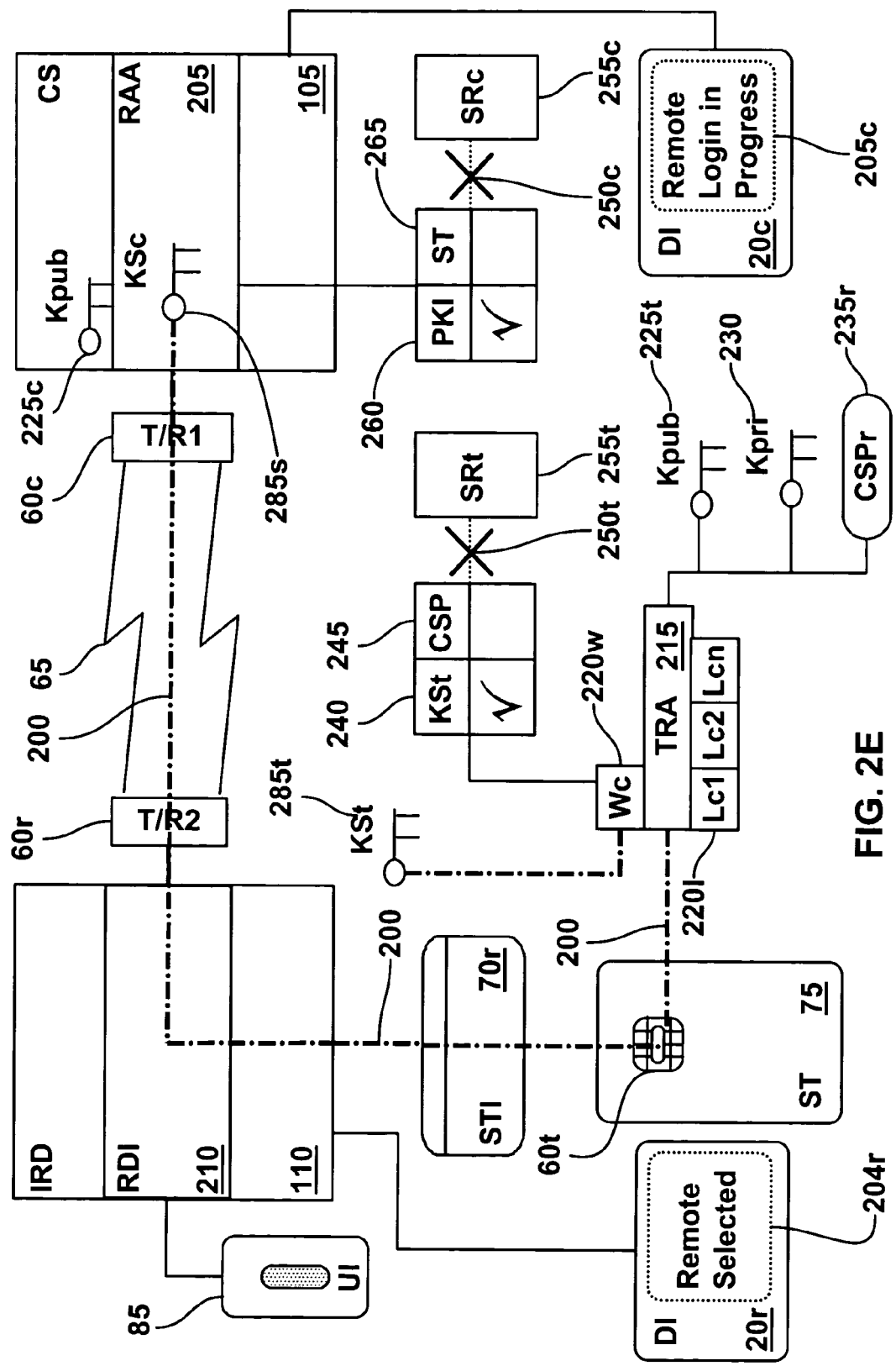
FIG. 2E—is a detailed block diagram of the invention where a secure end-to-end communications connection is established between the security token enabled computer system and the security token.

Referring to FIG. 2E, the token shared symmetric key KSt 285t is assigned to the dedicated communications channel Wc 220w which establishes the secure end-to-end communications connection 200. The share symmetric keys KSt 285t, KSc 285c are used as block cipher keys during information exchange over the secure end-to-end communications connection. The establishment of the secure end-to-end communications connection 200 fulfills a first element of the token's authentication state table 240. The dedicated communications channel restricts the secure end-to-end communications connection to a single wireless secure communications connection 200 with the security token to prevent unauthorized entities from eavesdropping on subsequent security token transactions.

Figure 2F:
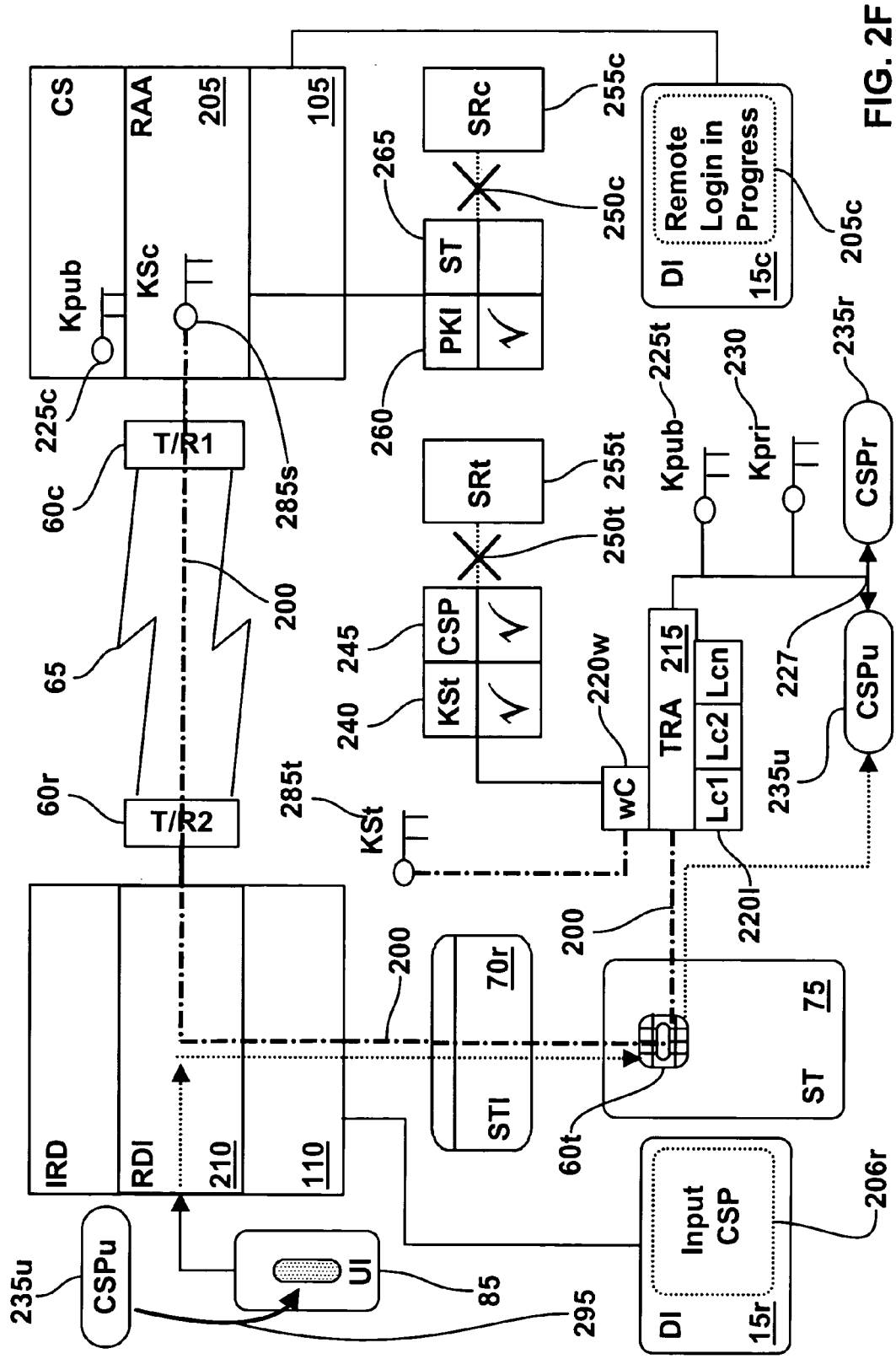
FIG. 2F—is a detailed block diagram of the invention where a user's critical security parameter is provided to the intelligent remote device and routed to the operatively coupled security token to authenticate the user.

Referring to FIG. 2F, the final security transaction is performed where the user is prompted 206r on the display 20r associated with the intelligent remote device IRD 110 to provide his or her critical security parameter CSPu 235u. The user's critical security parameter CSPu 235u is inputted 295 to the intelligent remote device IRD 110 via the user interface UI 85 and routed to the security token ST 75 for authentication.

The user's critical security parameter CSPu 235 is compared 227 to the reference critical security parameter CSPr 235r by the token remote access application TRA 215. If a match is found between the user's critical security parameter CSPu 235 and the reference critical security parameter CSPr 235r, the critical security parameter CSP 245 element of the token's authentication state table is fulfilled. If the critical security parameter fails this second authentication transaction processing ends and a new attempt to establish the secure end-to-end communications connection will need to be performed.

Figure 2G:
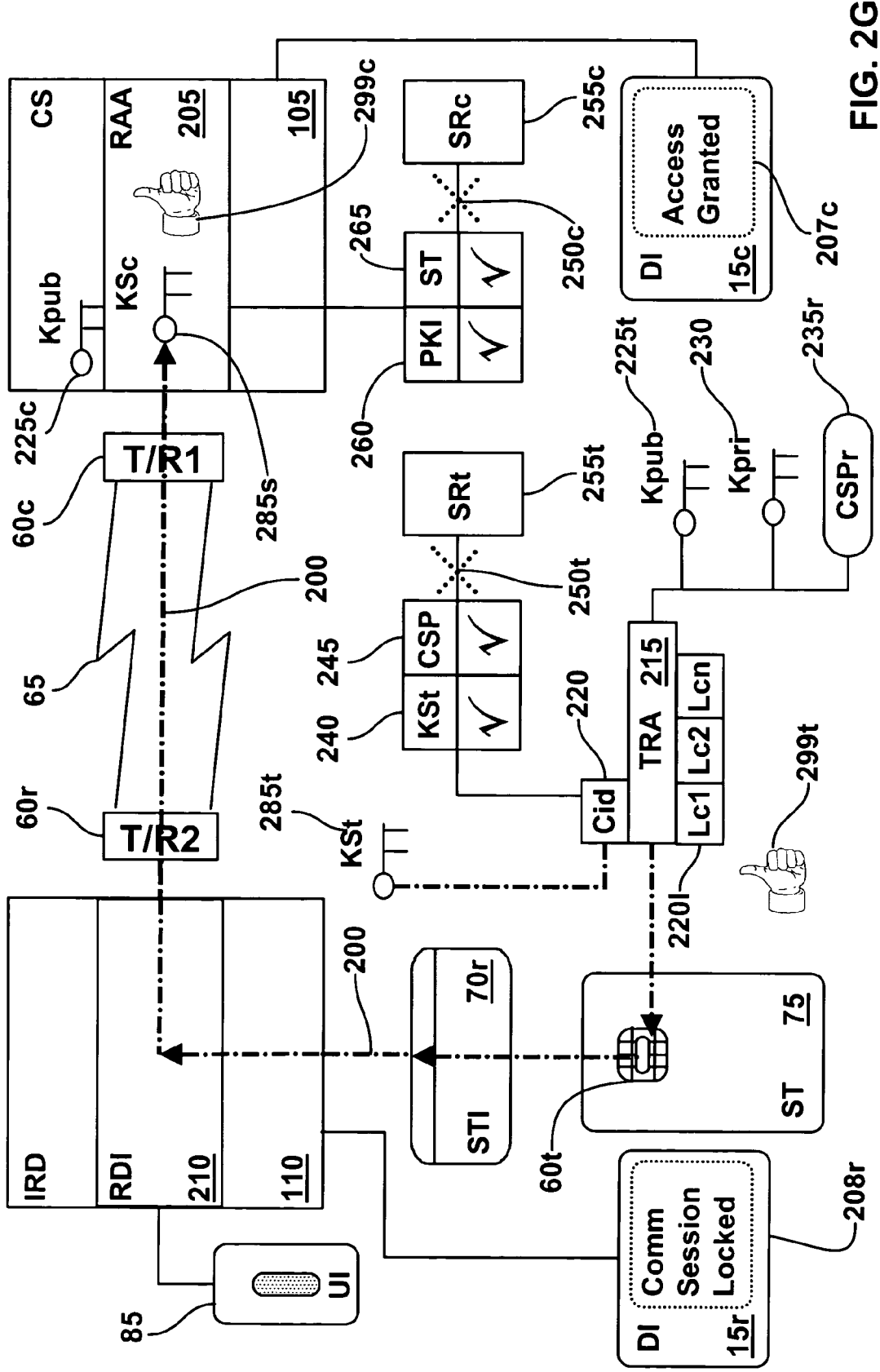
FIG. 2G—is a detailed block diagram of the invention where the intelligent remote device has successfully been authenticated to the security token enabled computer system.

Referring to FIG. 2G, the final phase of the invention implementation is depicted where an affirmative result signal 299t is transmitted from the security token ST 75 to the security token enabled computer system via the secure end-to-end communications connection 200. The receipt of the affirmative result signal 299c fulfills the second element ST 265 of the computer system's authentication state table which allows access 250t, 250c to the one or more secure resources 255t, 255c associated with the security token ST 75, security token enabled computer system CS 105 or both devices.

The user display DI 20r associated with intelligent remote device IRD 110 optionally provides at least visual indication 208r that a secure messaging session is in progress. Likewise, the user display DI 20c associated with the security token enabled computer system CS 105 provides at least visual indication 207c that access has been granted remotely. Other types of visual, aural and vibratory feedback are envisioned as well.

Figure 3:
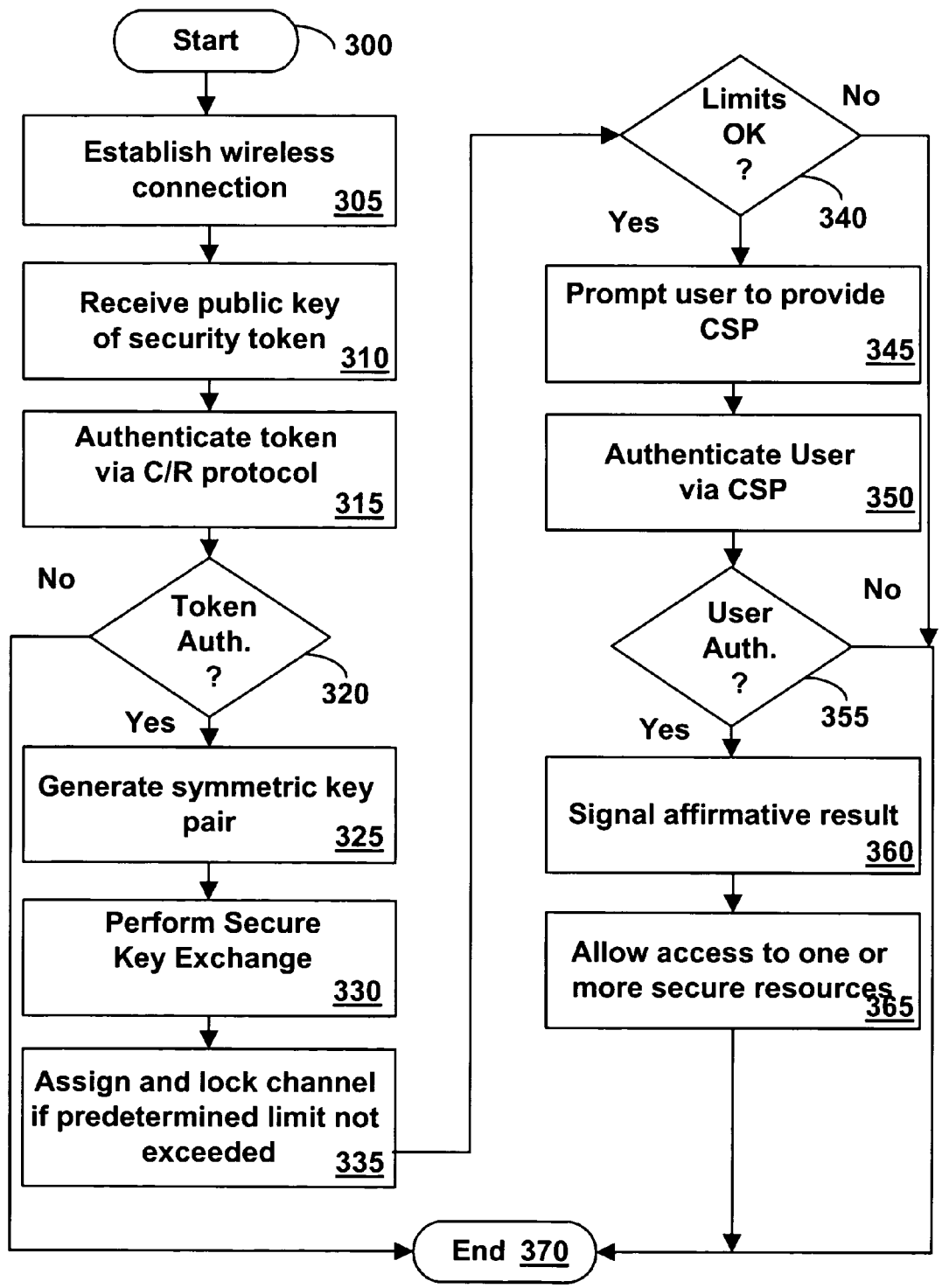
FIG. 3—is a flow diagram illustrating the major steps associated with establishing the secure end-to-end communications connection between the security token enabled computer system and an intelligent remote device having a security token operatively coupled thereto.

Referring to FIG. 3, the major steps for implementing the invention are depicted. The process is initiated 300 by establishment of a wireless communications connection between a security token enabled computer system and an intelligent remote device having a security token operatively coupled thereto. A public key is sent from the security token via the intelligent remote device to the security token enabled computer system 310, preferably as part of an X.509 formatted digital certificate. Transfer of the public key may be automatically performed during a communications handshake or by user interaction.

The security token enabled computer system authenticates 315 the security token using a challenge/response protocol, whereby a challenge is generated, encrypted using the received public key, then transmitted to the security token over the wireless communications connection. The security token receives the cryptogram and decrypts the challenge using a private key counterpart of the public key. The clear text challenge is then returned to the security token enabled computer system for authentication. If the security token is not authenticated 320 processing ends 370. If the security token is authenticated 320, a symmetric key set is generated on the security token enabled computer system 325 and a secure key exchange 330 performed with the security token, whereby at least one of the symmetric keys is encrypted using the public key and sent over the wireless communications connection to the security token.

The received encrypted symmetric key is decrypted using the private key, assigned to a dedicated communications channel and the dedicated communications channel locked if a predetermined limit of preexisting wireless communications connections is not exceeded 335. If the predetermined limit is exceeded 345, processing ends 375. The predetermined limit is usually set to 1 in the preferred embodiment of the invention.

A first security state is set by either or both the security token and/or security token enabled computer system which indicates that a secure communications channel has been established. In one embodiment of the invention, the secure communications channel is not enabled until the user is authenticated as described below.

If the predetermined limit is not exceeded 345, the user is prompted 350 to provide his or her critical security parameter to the intelligent remote device. The provided critical security parameter is then authenticated 355 by the security token by comparing a reference critical security parameter to the received critical security parameter. If the user is not authenticated 360, processing ends. If the user is authenticated 355, an affirmative result signal is optionally generated by the security token and sent to the security token enabled computer system 365. Receipt of the affirmative result signal allows access to one or more secure resources 370. Processing ends 375 normally at the conclusion of the secure communications session by the user, removal of the security token from the intelligent remote device or moving outside of a predetermined proximity range from the security token enabled computer system.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular security token operating environment. Other variations and embodiments are possible in light of above teachings, and it is not intended that this Detailed Description limit the scope of invention, but rather by the claims that follow herein.

What is claimed:

1. A method for establishing a secure end-to-end communications connection between a security token enabled computer system and a security token associated with a wireless intelligent remote device comprising the steps of:
    a. performing a first security transaction which authenticates said security token to said security token enabled computer system;
    b. establishing a secure communications connection between said security token and said security token enabled computer system which incorporates a shared symmetric key set generated during said first security transaction;
    c. assigning at least one key from said shared symmetric key set to a dedicated communications channel accessible to said security token; and
    d. performing a second security transaction which authenticates a user to said security token, the second security transaction being different from the first security transaction and performed after the first security transaction, and wherein, after successfully completing the first security transaction and then the second security transaction, the secure end-to-end communications connection between the security token enabled computer system and the security token is established.

2. The method according to claim 1 wherein said user is authenticated to said security token by providing a critical security parameter directly or indirectly to said security token via said intelligent remote device.

3. The method according to claim 1 further including the step of setting at least a first security state following the successful completion of said first security transaction.

4. The method according to claim 1 further including the step of setting at least a second security state following the successful completion of said second security transaction.

5. The method according to claim 4 further including the step of enabling the use of said secure communications connection following the setting of said at least a second security state.

6. The method according to claim 1 wherein said secure communications connection is anonymous to but controlled by said security token.

7. The method according to claim 1 wherein said first security transaction comprises a challenge/response protocol which incorporates an asymmetric key pair.

8. The method according to claim 1 further including the step of signaling said security token enabled computer system by said security token if said second security transaction is successful.

9. The method according to claim 1 wherein said secure communications connection is established at least in part over a wireless telecommunications connection.

10. The method according to claim 1 further including the step of allowing said user access to one or more secure resources following successful completion of said second security transaction.

11. The method according to claim 10 wherein said secure communications connection is only available when said security token is in proximity to said security token enabled computer system.

12. The method according to claim 1 wherein step 1.b further includes the steps of;
    1.b.1 generating said shared symmetric key set by said security token enabled computer system,
    1.b.2 encrypting said at least one key with a public key associated with said security token,
    1.b.3 sending the encrypted said at least one key to said security token, and
    1.b.4 decrypting the said at least one key with a private key associated with said security token.

13. The method according to claim 1 wherein said dedicated communications channel prevents the number of concurrent wireless secure communications connections with said security token from exceeding a predetermined limit.

14. The method according to claim 13 wherein said predetermined limit is 1.

15. The method according to claim 1, further comprising the step of establishing a wireless communications connection between said intelligent remote device and said security token enabled computer system.

16. The method according to claim 15 further including the step of allowing said user access to one or more secure resources following successful completion of said second security transaction.

17. The method according to claim 15 wherein step 15.d further includes the steps of 15.d.1 prompting said user to provide said critical security parameter, and 15.d.2 signaling an affirmative result to said security token enabled computer system if said second security transaction is successful.

18. The method according to claim 15 wherein step 15.a further includes the step of sending a digital certificate to said security token enabled computer system.

19. The method according to claim 15 wherein step 15.a further includes the step of prompting said user to select either a local or remote authentication transaction.

20. The method according to claim 15 wherein step 15.a further includes the step of providing said user a sensory feedback from at least said security token enabled computer system indicative of a remote authentication transaction in progress.

21. The method according to claim 20 wherein said sensory feedback includes visual, tactile, aural or vibratory feedback.

22. The method according to claim 15 wherein said exclusive wireless secure communications connection is associated with a dedicated communications channel which prevents concurrent wireless secure communications connections from being established with said security token.

23. The method according to claim 15 wherein said exclusive wireless secure communications connection is only available when said security token is in the proximity of said security token enabled computer system.

24. A system for establishing a secure end-to-end communications connection between a security token enabled computer system and a security token associated with a wireless intelligent remote device comprising:
 said security token enabled computer system including:
  a first security transaction section for at least authenticating said security token to said security token enabled computer system in a first security transaction;
  a first secure communications connection section for at least establishing a cryptographically encoded link between said security token enabled computer system and said security token, wherein said first secure communications connection section includes a symmetric key set generation section and a secure symmetric key exchange section;
 said intelligent remote device including:
  a security token interface section for at least operatively coupling said security token to said intelligent remote device;
  a user interface section for at least receiving and routing a critical security parameter provided by said user to said security token interface section;
 said security token including:
  a second secure communications connection section for at least establishing said cryptographically encoded link in conjunction with said first secure communications connection section;
  a dedicated communications channel section for preventing a concurrent cryptographically encoded link from being established with said security token; and
  a second security transaction section for at least authenticating said user to said security token using at least said critical security parameter in a second security transaction, the second security transaction being different from the first security transaction and performed after the first security transaction, and wherein, after successfully completing the first security transaction and then the second security transaction, the secure end-to-end communications connection between the security token enabled computer system and the security token is established.

25. The system according to claim 24 wherein said user interface section includes conditional section for conditionally receiving said critical security parameter.

26. The system according to claim 25 wherein said conditional section limits or prevents receiving said critical security parameter until said cryptographically encoded link is established.

27. The system according to claim 24 wherein said security token enabled computer system is in wireless communications with said intelligent remote device and said operatively coupled security token.

28. The system according to claim 24 wherein said first security transaction section includes a challenge/response protocol section and an asymmetric cryptography section.

29. The system according to claim 24 wherein said security token interface section includes security token communications section and electromagnetic power transfer section.

30. The system according to claim 24 wherein said dedicated communications channel section includes a unique channel identifier section which is accessible by said security token enabled computer system.

31. The system according to claim 24 wherein successful execution of said first security transaction section sets a first computer system security state associated with said security token enabled client.

32. The system according to claim 24 wherein establishment of said cryptographically encoded link sets a first token security state associated with said security token.

33. The system according to claim 24 wherein successful execution of said second security transaction section sets a second token security state associated with said security token.

34. The system according to claim 24 wherein said security token enabled computer system further includes proximity sensing section.

35. A system for establishing a secure end-to-end communications connection between a security token enabled computer system and a security token associated with a wireless intelligent remote device comprising:
 said security token enabled computer system including:
  a first processor;
  a first memory coupled to said first processor;
  at least one remote authentication application operatively stored in a first portion of said first memory having logical instructions executable by said first processor to:
   authenticate said security token to the security token enabled computer system in a first security transaction;
   establish a secure end-to-end communications connection with said security token;
 said intelligent remote device including:
  a second processor;
  a second memory coupled to said second processor;
  a security token interface coupled to said second processor;
  a user interface coupled to said second processor; and,
  at least one remote device interface application operatively stored in a portion of said second memory having logical instructions executable by said second processor to:
   emulate a security token device interface locally coupled to at least said security token enabled computer system; and,
   conditionally receive and route a critical security parameter provided by said user via said user interface to said security token; and
 said security token including:
  at least a third processor;
  a third memory coupled to said at least a third processor;
  a communications and electromagnetic power interface coupled to said at least a third processor and said security token interface;
  at least one token remote authentication application operatively stored in a second portion of said third memory having logical instructions executable by said at least a third processor to:
   establish said secure end-to-end communications connection in conjunction with said security token enabled computer system;

restrict said secure end-to-end communications connection to a single wireless communications channel; and authenticate said user to the security token based at least in part on said critical security parameter in a second security transaction, the second security transaction being different from the first security transaction and performed after the first security transaction, and wherein, after successfully completing the first security transaction and then the second security transaction, the secure end-to-end communications connection between the security token enabled computer system and the security token is established.

36. The system according to claim 35 further including a first wireless transceiver functionally coupled to said first processor in processing communications with a second wireless transceiver functionally coupled to said second processor.

37. The system according to claim 35 further including a public key associated with said security token retrievably stored in a second portion of said first memory and a private key retrievably stored in a second portion of said third memory, wherein said private key is a counterpart to said public key 38. The system according to claim 37 wherein said public and private keys are incorporated into a challenge/response protocol used to authenticate said security token to said security token enabled computer system.

39. The system according to claim 38 wherein said at least one remote authentication application further includes logical instructions executable by said first processor to generate a symmetric key set and perform a secure key exchange with said security token.

40. The system according to claim 39 wherein said secure key exchange is performed using said public and private keys.

41. The system according to claim 40 wherein said dedicated communications channel includes a unique identifier available by said security token enabled computer system.

42. The system according to claim 39 wherein said symmetric key set is incorporated into said secure end-to-end communications connection.

43. The system according to claim 35 further including a reference critical security parameter retrievably stored in a third portion of said third memory.

44. The system according to claim 43 wherein said user is authenticated by said at least one token remote authentication application by comparing said provided critical security parameter to said reference critical security parameter.

45. The system according to claim 35 wherein said at least one token remote authentication application restricts usage of said secure end-to-end communications connection until said user is authenticated.

46. The system according to claim 35 wherein said secure end-to-end communications connection is restricted to a single wireless connection with said security token using a dedicated communications channel controlled by said at least one token remote authentication application.

47. The system according to claim 35 wherein said communications and electromagnetic power interface includes inductive means, capacitive means or electric contact means.

48. A non-transitory computer readable medium storing computer software for establishing a secure end-to-end communications connection between a security token enabled computer system and a security token associated with a wireless intelligent remote device, said computer software comprising:

executable instructions for causing said security token processor to:
utilize one or more security token emulation services provided by an intelligent remote device processor;
establish a secure end-to-end communications connection in conjunction with a security token enabled computer system processor;
restrict said secure end-to-end communications connection to a single wireless secure communications channel, and
authenticate a user;

executable instructions for causing said intelligent remote device processor to:
provide said one or more security token emulation services to said security token processor; and
receive and route a critical security parameter provided by said user via said user interface to said security token to authenticate the user to the security token in a first security transaction; and executable instructions for causing said security token enabled computer system processor to:
authenticate said security token to the security token enabled computer system processor in a second security transaction, wherein the second security transaction is performed after the first security transaction, and wherein after successful completion of the first security transaction and then the second security transaction, the secure end-to-end communications connection between the security token enabled computer system and the security token is established.

49. The non-transitory computer readable medium according to claim 48, wherein the computer software further comprises:
executable instructions stored thereon for causing said security token enabled computer system processor to allow said user access to one or more secure resources following authentication of said user in the second security transaction.

50. The non-transitory computer readable medium according to claim 48, wherein the non-transitory computer readable medium includes magnetic media, optical media or logical media.

51. The non-transitory computer readable medium according to claim 48, wherein said executable instructions are stored in a code format comprising byte code, compiled, interpreted, compliable and interpretable.

52. A method for establishing a secure end-to-end communications connection between a security token enabled computer system and a security token associated with a wireless intelligent remote device, the method comprising:
performing a first security transaction which authenticates said security token to said security token enabled computer system;
establishing a secure communications connection between said security token and said security token enabled computer system according to a result of the first security transaction; and
performing a second security transaction which authenticates a user to said security token, the second security transaction being different from the first security transaction, wherein the second security transaction is performed after successfully completing the first security transaction and includes authenticating the user to said security token using a critical security parameter received from the user via said intelligent remote device, and wherein, after successfully completing the first security transaction and then the second security transaction, the secure end-to-end communications connection between the security token enabled computer system and the security token is established.

* * * * *